United States Patent
Tachibana et al.

(10) Patent No.: US 11,423,936 B2
(45) Date of Patent: *Aug. 23, 2022

(54) MAGNETIC RECORDING MEDIUM AND METHOD OF PRODUCING THE SAME

(71) Applicant: Sony Corporation, Tokyo (JP)

(72) Inventors: Junichi Tachibana, Miyagi (JP); Jota Ito, Miyagi (JP); Tomoe Ozaki, Miyagi (JP); Ryoichi Hiratsuka, Miyagi (JP); Noboru Sekiguchi, Miyagi (JP); Tetsuo Endo, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/273,694

(22) Filed: May 9, 2014

(65) Prior Publication Data

US 2014/0342189 A1 Nov. 20, 2014

(30) Foreign Application Priority Data

May 17, 2013 (JP) .............................. JP2013-105389
Dec. 27, 2013 (JP) .............................. JP2013-272778

(51) Int. Cl.
*G11B 5/73* (2006.01)
*G11B 5/65* (2006.01)

(52) U.S. Cl.
CPC .............. *G11B 5/7379* (2019.05); *G11B 5/65* (2013.01); *Y10T 156/10* (2015.01)

(58) Field of Classification Search
CPC .. G11B 5/732; G11B 5/65; G11B 5/84; Y10T 156/10
See application file for complete search history.

(56) References Cited

U.S. PATENT DOCUMENTS

| | | | | |
|---|---|---|---|---|
| 5,700,593 A | * | 12/1997 | Okumura | G11B 5/656 428/336 |
| 7,470,475 B2 | * | 12/2008 | Ajan | G11B 5/7379 428/831 |
| 2003/0157370 A1 | * | 8/2003 | Nakamura | G11B 5/656 428/836.3 |
| 2005/0089726 A1 | * | 4/2005 | Abarra | G11B 5/7379 428/831 |
| 2005/0255337 A1 | * | 11/2005 | Mukai | G11B 5/65 428/831 |

(Continued)

FOREIGN PATENT DOCUMENTS

| | | |
|---|---|---|
| JP | 10-154326 A | 6/1998 |
| JP | 2005-196885 | 7/2005 |

(Continued)

OTHER PUBLICATIONS

Machine English Translation: Sato et al. (JP 2005-196885).*

(Continued)

*Primary Examiner* — Holly Rickman
*Assistant Examiner* — Linda N Chau
(74) *Attorney, Agent, or Firm* — Wolf, Greenfield & Sacks, P.C.

(57) ABSTRACT

There is provided a magnetic recording medium including a base; a seed layer; a foundation layer; and a recording layer, the seed layer being disposed between the base and the foundation layer, having an amorphous state, including an alloy containing Ti, Cr and O, a percentage of Ti being 30 atomic % to 100 atomic % based on a total amount of Ti and Cr contained in the seed layer, and a percentage of O being 15 atomic % or less based on a total amount of Ti, Cr and O contained in the seed layer. Also, a production method thereof is provided.

15 Claims, 6 Drawing Sheets

(56) References Cited

U.S. PATENT DOCUMENTS

| | | | |
|---|---|---|---|
| 2008/0044688 A1* | 2/2008 | Li | G11B 5/732 428/831 |
| 2008/0292909 A1* | 11/2008 | Igarashi | G11B 5/65 428/846.5 |
| 2010/0323222 A1 | 12/2010 | Nakashio et al. | |
| 2011/0111257 A1* | 5/2011 | Kurokawa | G11B 5/732 428/800 |
| 2011/0311841 A1* | 12/2011 | Saito | G11B 5/65 428/848.1 |
| 2014/0329112 A1 | 11/2014 | Aizawa | |
| 2014/0363700 A1 | 12/2014 | Tachibana et al. | |
| 2015/0004437 A1* | 1/2015 | Moriya | G11B 5/66 428/827 |
| 2015/0111066 A1 | 4/2015 | Terakawa et al. | |
| 2016/0099018 A1 | 4/2016 | Aizawa | |

FOREIGN PATENT DOCUMENTS

| | | | |
|---|---|---|---|
| JP | 2005196885 A | * | 7/2005 |
| JP | 2005-353191 A | | 12/2005 |
| JP | 2006012319 A | * | 1/2006 |
| JP | 2006-228393 A | | 8/2006 |
| JP | 2007-018625 A | | 1/2007 |
| JP | 2007-257679 A | | 10/2007 |
| JP | 2008-276833 A | | 11/2008 |
| JP | 2009-059431 A | | 3/2009 |
| JP | 2010-257567 A | | 11/2010 |

OTHER PUBLICATIONS

Roy et al., Effect of seed layers in improving the crystallographic texture of CoCrPt perpendicular recording media, Journal of Applied Physics, vol. 91, No. 10, 2002, p. 8076-8078.*

English Machine Translation: Terajima et al. (JP 2006-012319).*

U.S. Appl. No. 12/815,678, filed Jun. 15, 2010, Nakashio et al.

U.S. Appl. No. 14/250,097, filed Apr. 10, 2014, Aizawa.

U.S. Appl. No. 14/289,762, filed May 29, 2014, Tachibana et al.

U.S. Appl. No. 14/514,518, filed Oct. 15, 2014, Terakawa et al.

U.S. Appl. No. 14/879,976, filed Oct. 9, 2015, Aizawa.

U.S. Appl. No. 15/208,932, filed Jul. 13, 2016, Tachibana et al.

* cited by examiner

MAGNETIC RECORDING MEDIUM AND METHOD OF PRODUCING THE SAME

CROSS REFERENCE TO RELATED APPLICATIONS

This application claims the benefit of Japanese Priority Patent Application JP 2013-272778 filed Dec. 27, 2013 and Japanese Priority Patent Application JP 2013-105389 filed May 17, 2013, the entire contents of which are incorporated herein by reference.

BACKGROUND

The present technology relates to a magnetic recording medium and a method of producing the same. More particularly, the present technology relates to a magnetic recording medium and a method of producing the same having a seed layer.

SUMMARY

In recent years, tape media for storing data having a higher capacity is highly demanded as an IT (Information Technology) society grows, libraries and archives are computerized, and business documents are stored for extended period. In addition, there is needed a storage system called as a "green storage" that has decreased power consumption and is environmentally benign.

Currently, as the tape media for storing data, coated type magnetic tape media where a non-magnetic support is coated with magnetic powder are mainly used. In order to increase a memory capacity per cartridge, a surface recording density has to be increased by micronizing the magnetic powder. In the coating method currently available, it is difficult to form a thin film using fine particles each having a size of 10 nm or less.

There is proposed a vertical magnetic recording medium where a film is formed on a non-magnetic support by sputtering a highly magnetic anisotropic CoCrPt based metal material, and the material is crystalline oriented in a direction vertical to the surface of the non-magnetic support. In the vertical magnetic recording medium, improvements in orientation and magnetic property of a magnetic recording layer are necessary. Recently, a variety of technologies have been sought to satisfy the needs. For example, Japanese Patent Application Laid-open No. 2005-196885 discloses a magnetic recording medium including a non-magnetic support on which at least an amorphous layer, a seed layer, a foundation layer, a magnetic layer and a protective layer are sequentially formed. Also, it discloses that the seed layer is formed any of Ti, Cr, Mo, W, Zr, a Ti alloy, a Cr alloy and Zr alloy, the foundation layer is formed of Ru, and the magnetic layer has a granular structure.

It is therefore desirable to provide a magnetic recording medium and a method of producing the same having an improved magnetic property.

According to a first embodiment of the present technology, there is provided a magnetic recording medium, including:
  a base;
  a seed layer;
  a foundation layer; and
  a recording layer, the seed layer being disposed between the base and the foundation layer, having an amorphous state, including an alloy containing Ti, Cr and O, a percentage of Ti being 30 atomic % to 100 atomic % based on a total amount of Ti and Cr contained in the seed layer, and a percentage of O being 15 atomic % or less based on a total amount of Ti, Cr and O contained in the seed layer.

According to a second embodiment of the present technology, there is provided a magnetic recording medium, including:
  a base;
  a seed layer;
  a foundation layer; and
  a recording layer, the seed layer being disposed between the base and the foundation layer, having an amorphous state, including an alloy containing Ti and Cr, and a percentage of Ti being 30 atomic % to 100 atomic % based on a total amount of Ti and Cr contained in the seed layer.

According to a third embodiment of the present technology, there is provided a magnetic recording medium, including:
  a base;
  a layer having an amorphous state and containing Ti and Cr;
  a foundation layer; and
  a recording layer, the layer containing Ti and Cr being disposed between the base and the foundation layer, and a percentage of Ti in the layer containing Ti and Cr being 30 atomic % to 100 atomic % based on a total amount of Ti and Cr.

According to a fourth embodiment of the present technology, there is provided a method of producing a magnetic recording medium, including:
  sequentially forming a seed layer, a foundation layer and a recording layer on a base by a roll-to-roll method, the seed layer having an amorphous state and including an alloy containing Ti, Cr and O, a percentage of Ti being 30 atomic % to 100 atomic % based on a total amount of Ti and Cr contained in the seed layer, and a percentage of O being 15 atomic % or less based on a total amount of Ti, Cr and O contained in the seed layer.

According to a fifth embodiment of the present technology, there is provided a method of producing a magnetic recording medium, including:
  laminating a plurality of thin-films on a surface of a base while the base is transferred along a periphery of a rotator, at least two layer of a plurality of the thin-films being sequentially formed.

In the present technology, each of the seed layer, the foundation layer and the recording layer may have a monolayer structure or a multilayer structure. From a standpoint of further improving the magnetic property and/or the recording and reproducing properties of the magnetic recording medium, the multilayer structure is desirably used. In view of productivity, a bilayer structure among the multilayer structures is desirably used.

In the present technology, it is desirable that the magnetic recording medium further include a soft magnetic layer disposed between the seed layer and the foundation layer. The soft magnetic layer may have a monolayer structure or a multilayer structure. From a standpoint of further improving the recording and reproducing properties, the multilayer structure is desirably used. Desirably, the soft magnetic layer having the multilayer structure includes a first soft magnetic layer, an intermediate layer and a second soft magnetic layer, and the intermediate layer is disposed between the first magnetic layer and the second magnetic layer. When the magnetic recording medium further includes the soft magnetic layer, it is desirable that another seed layer is provided between the soft magnetic layer and the foundation layer.

In the present technology, at least two of the seed layer, the foundation layer and the recording layer are desirably sequentially formed by a roll-to-roll method. More desirably, all of the three layers are sequentially formed by the roll-to-roll method. When the magnetic recording medium further includes the soft magnetic layer, at least two of the seed layer, the soft magnetic layer, the foundation layer and the recording layer are desirably sequentially formed by a roll-to-roll method. More desirably, all of the four layers are sequentially formed by the roll-to-roll method.

In the present technology, the seed layer having an amorphous state and containing Ti and Cr is disposed between the base and the foundation layer. This enables the effects of $O_2$ gas and $H_2O$ adsorbed on the base on the foundation layer to be suppressed and a metallic smooth surface to be formed on the surface of the base.

These and other objects, features and advantages of the present technology will become more apparent in light of the following detailed description of best mode embodiments thereof, as illustrated in the accompanying drawings.

DETAILED DESCRIPTION OF EMBODIMENTS

Figure 1:
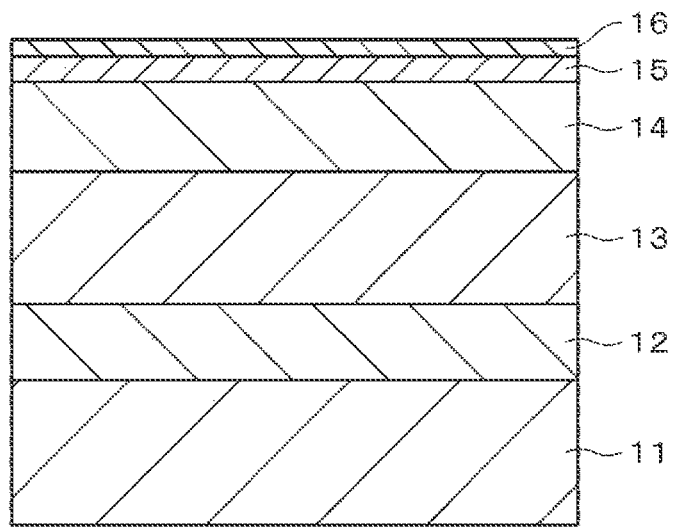
FIG. 1 is a sectional view schematically showing a configuration example of a vertical magnetic recording medium according to a first embodiment of the present technology.

Hereinafter, an embodiment of the present technology will be described with reference to the drawings.

The embodiments of the present technology will be described in the following order.

1. First Embodiment (Example of Vertical Magnetic Recording Medium having Monolayer Seed Layer)
1.1 General
1.2 Configuration of Vertical Magnetic Recording Medium
1.3 Configuration of Sputter Apparatus
1.4 Method of Producing Vertical Magnetic Recording Medium
1.5 Advantages
2. Second Embodiment (Example of Vertical Magnetic Recording Medium having Bilayer Seed Layer)
2.1 Configuration of Vertical Magnetic Recording Medium
2.2 Advantages
3. Third Embodiment (Example of Vertical Magnetic Recording Medium having Bilayer Foundation layer)
3.1 Configuration of Vertical Magnetic Recording Medium
3.2 Advantages
3.3 Modification Embodiment
4. Fourth Embodiment (Example of Vertical Magnetic Recording Medium further having Monolayer Soft Magnetic Under layer)
4.1 Configuration of Vertical Magnetic Recording Medium
4.2 Advantages
4.3 Modification Embodiment
5. Fifth Embodiment (Example of Vertical Magnetic Recording Medium further having Mutilayer Soft Magnetic Underlayer)
5.1 Configuration of Vertical Magnetic Recording Medium
5.2 Advantages
5.3 Modification Embodiment 1. First Embodiment 1.1 General In order to decrease orientation dispersion of a magnetic recording layer, a foundation layer plays an important role. The reason is that (1) selecting the foundation layer having a good orientation improves an orientation of the magnetic recording layer and (2) a good matching of lattice constants in the foundation layer and the magnetic recording medium improves an interfacial adhesion between the foundation layer and the magnetic recording layer, thereby suppressing a formation of an initial growth layer. Thus, it is desirable that the foundation layer improve the orientation of the magnetic recording layer and suppress the formation of the initial growth layer at the same time.

To attain the granular structure that is mainly used as a material for a recording layer of a vertical magnetic recording medium in recent years, the foundation layer plays an important role from a morphological perspective. In this context, the granular structure refers to a structure where a non-magnetic body surrounds a ferromagnetic column. When the material for the recording layer having the granular structure is used, the foundation layer desirably enhances the granular structure in addition to the above-described two roles at the same time.

For example, as the foundation layer of the magnetic recording medium having the granular structure, Ru or an Ru alloy is generally used. Ru has a hexagonal close-packed (hcp) structure which is the same crystal structure as a Co-based alloy often used as the magnetic recording layer. Therefore, the lattice constants are relatively matched well.

However, when the foundation layer is directly formed on a base of the magnetic recording medium, the orientation of the foundation layer is significantly lowered due to effects of $O_2$ or $H_2O$ adsorbed on the surface of the base and minor irregularities on the surface of the base. In pursuit of improving the orientation of the foundation layer, the present inventors have repeated earnest studies. As a result, the present inventors have found that the orientation of the foundation layer can be improved, i.e., the magnetic property can be improved, by disposing a seed layer in an amorphous state including an alloy containing Ti and Cr between the base and the foundation layer.

By further studies of the present inventors about the magnetic recording medium having the above-mentioned seed layer, it is found that the orientation of the foundation layer in the magnetic recording medium is lowered depending on a composition of the seed layer. As a result of still further studies of the present inventors about the composition of the seed layer, it is found that the orientation of the foundation layer is prevented from being lowered by limiting a percentage of Ti to 30 atomic % to 100 atomic % based on a total amount of Ti and Cr contained in the seed layer.

In addition, by intensive studies of the present inventors about the seed layer containing impurity oxygen, it is found that the orientation of the foundation layer is prevented from being lowered by limiting a percentage of O to 15 atomic % or less based on a total amount of Ti, Cr and O contained in the seed layer.

In view of the above, the present inventors have completed the magnetic recording medium according to the embodiment.

1.2 Configuration of Magnetic Recording Medium

FIG. 1 is a sectional view schematically showing a configuration example of a magnetic recording medium according to a first embodiment of the present technology. The magnetic recording medium is a so-called monolayer vertical magnetic recording medium, and includes a base 11, a seed layer 12 formed on the surface of the base 11, a foundation layer 13 formed on the surface of the seed layer 12, a magnetic recording layer 14 formed on the surface of the foundation layer 13, a protective layer 15 formed on the surface of the magnetic recording layer 14, and a top coat layer 16 formed on the surface of the protective layer 15, as shown in FIG. 1. Note that a recording medium having no soft magnetic underlayer is called as "a monolayer vertical magnetic recording medium" and a recording medium having a soft magnetic underlayer is called as "a bilayer vertical magnetic recording medium".

The magnetic recording medium can be suitably used as a storage media for data archiving that is expected to have an increasing demand in the future. The magnetic recording medium can provide a surface recording density of 50 Gb/in$^2$ that is 10 times or greater of that of the existing coating type magnetic tape for storage. When the magnetic recording medium having such surface recording density is used to configure a general data cartridge having a linear recording system, a mass storage recording is possible such as 50 TB or more per data cartridge. The magnetic recording medium is desirably used for a recording and reproducing apparatus using a ring-shaped recording head and a giant magnetoresistive (GMR) type reproducing head.

1.3 Configuration of Sputter Apparatus (Base)

The base 11 used for the support is, for example, an elongated film. As the base 11, a non-magnetic base having flexibility is desirably used. As the material for the non-magnetic base, a flexible polymer resin material that is used for a general magnetic recording medium can be used. Examples of the polymer material include polyesters, polyolefins, cellulose derivatives, vinyl-based resins, polyimides, polyamides and polycarbonate.

(Seed Layer)

The seed layer 12 is disposed between the base 11 and the foundation layer 13. The seed layer 12 includes the alloy containing Ti and Cr. The alloy has an amorphous state. Specifically, the seed layer 12 includes the alloy containing Ti and Cr and has the amorphous state. The alloy may further contain O (oxygen). The oxygen is a minor amount of impurity oxygen contained in the seed layer 12 when the seed layer 12 is formed by a film forming method such as a sputtering method. Note that the "seed layer" means not an intermediate layer having a crystal structure similar to the foundation layer 13 formed for crystal growth, but an intermediate layer that improves vertical orientation of the foundation layer 13 by flatness and the amorphous state of the seed layer 12. The "alloy" means at least one of a solid solution containing Ti and Cr, an eutectic body and an intermetallic compound. The "amorphous state" means that halo is observed and no crystal structure is specified by an electron diffraction method.

The seed layer 12 including the alloy containing Ti and Cr and having the amorphous state is effective to suppress the effect of $O_2$ gas or $H_2O$ adsorbed on the base 11 and to decrease the irregularities on the surface of the base 11, thereby forming a metallic smooth surface on the surface of the base 11. This allows the vertical orientation of the foundation layer 13 to be improved. Note that when the seed layer 12 has a crystal state, columns are clearly formed along with the crystal growth, the irregularities on the surface of the base 11 become dominant, and the crystal orientation of the foundation layer 13 are lowered.

The percentage of O is desirably 15 atomic % (at %) or less, more desirably 10 at % or less based on a total amount of Ti, Cr and O (oxygen) contained in the seed layer 12. If the percentage of O exceeds 15 at %, $TiO_2$ crystal is grown which has an influence on crystal nucleation of the foundation layer 13 formed on the surface of the seed layer 12, resulting in a significantly lowered orientation of the foundation layer 13.

The percentage of Ti is desirably 30 at % to 100 at %, more desirably 50 at % to 100 at % based on a total amount of Ti and Cr contained in the seed layer 12. If the percentage of Ti is less than 30%, a (100) plane of a body-centered cubic lattice (bcc) structure of Cr is oriented, resulting in a lowered orientation of the foundation layer 13 formed on the surface of the seed layer 12.

The percentage of each element can be determined as follows: The magnetic recording medium is etched from a top coat 16 side using an ion beam. An outermost surface of the seed layer 12 etched is analyzed by the Auger electron spectroscopy to provide an average atomic number ratio to a film thickness as a ratio of each element. Specifically, three elements, Ti, Cr and O are analyzed to identify element contents by a percentage ratio.

The alloy included in the seed layer 12 may further contain elements other than Ti and Cr as additive elements. Examples of the additive elements include one or more of elements selected from the group consisting of Nb, Ni, Mo, Al and W.

(Foundation Layer)

Desirably, the foundation layer 13 has the same crystal structure as that of the magnetic recording layer 14. When the magnetic recording layer 14 includes a Co-based alloy, the foundation layer 13 includes a material having a hexagonal closest packing (hcp) structure similar to that of the Co-based alloy. Desirably, a c axis of the structure is oriented in a vertical direction (i.e., in a film thickness direction) to a film surface. This is because the orientation of the magnetic recording layer 14 can be improved and there can provide a relatively good match for the lattice constants between the foundation layer 13 and the magnetic recording medium 14. As the material having the hexagonal close-packed (hcp) structure, the material containing Ru is desirably used. Specifically, Ru alone or an Ru alloy is desirable. Examples of the Ru alloy include an Ru alloy oxide such as Ru—$SiO_2$, Ru—$TiO_2$ and Ru—$ZrO_2$.

(Magnetic Recording Layer)

The magnetic recording layer 14 is desirably the magnetic recording medium having a granular magnetic layer including the Co-based alloy in terms of an improvement in a recording density. The granular magnetic layer is composed of ferromagnetic crystal particles including the Co-based alloy and a non-magnetic grain boundary (a non-magnetic body) surrounding the ferromagnetic crystal particles. Specifically, the granular magnetic layer is composed of a column (a columnar crystal) including the Co-based alloy, and the non-magnetic grain boundary (e.g., an oxide such as $SiO_2$) that surrounds the column and magnetically separates each column. With this structure, the magnetic recording layer 14 where each column is magnetically separated can be provided.

The Co-based alloy has the hexagonal close-packed (hcp) structure having the c axis oriented vertical to the film surface (in the film thickness direction). As the Co-based alloy, a CoCrPt-based alloy including at least Co, Cr and Pt is desirably used. The CoCrPt-based alloy is not especially limited, and a CoCrPt alloy may further include an additive element. Examples of the additive element include at least one or more of elements selected from the group consisting of Ni and Ta.

The non-magnetic grain boundary surrounding the ferromagnetic crystal particles include a non-magnetic metal material. Herein, the metal includes semimetal. As the non-magnetic metal material, at least either of a metal oxide and a metal nitride can be used. From a standpoint of holding the granular structure more stably, the metal oxide is desirably used. The metal oxide includes at least one or more of elements selected from the group consisting of Si, Cr, Co, Al, Ti, Ta, Zr, Ce, Y and Hf and desirably includes at least a Si oxide (i.e., $SiO_2$). Specific examples include $SiO_2$, $Cr_2O_3$, CoO, $Al_2O_3$, $TiO_2$, $Ta_2O_5$, $ZrO_2$ and $HfO_2$. The metal nitride includes at least one or more of elements selected from the group consisting of Si, Cr, Co, Al, Ti, Ta, Zr, Ce, Y and Hf. Specific examples include SiN, TiN and AlN. In order to hold the granular structure more stably, the non-magnetic grain boundary desirably includes the metal oxide.

From a standpoint of further improving an SNR (Signal-Noise Ratio), the CoCrPt-based alloy included in the ferromagnetic crystal particles and the Si oxide included in the non-magnetic grain boundary have an average composition shown by the following chemical formula (1):

$$(Co_xPt_yCr_{100-x-y})_{100-z}—(SiO_2)_z \quad (1)$$

(in the formula (1), x, y and z have a value of 69≤x≤72, 12≤y≤16, 9≤z≤12).

The above-described composition can be determined as follows: The magnetic recording medium is etched from a top coat 16 side using an ion beam. An outermost surface of a magnetic recording layer 12 etched is analyzed by the Auger electron spectroscopy to provide an average atomic number ratio to a film thickness as a ratio of each element. Specifically, five elements, Co, Pt, Cr, Si and O are analyzed to identify element contents by a percentage ratio.

The magnetic recording medium according to the embodiment is a monolayer magnetic recording medium having no underlayer including a soft magnetic material (a soft magnetic underlayer). In such a type of the magnetic recording medium, when the effect of the diamagnetic field in a vertical direction caused by the magnetic recording layer 14 is great, a sufficient recording in the vertical direction may be difficult. The diamagnetic field is increased in proportion to the saturated magnetization amount Ms of the magnetic recording layer 14. Therefore, in order to decrease the diamagnetic field, it is desirable to decrease the saturated magnetization amount Ms. However, as the saturated magnetization amount Ms is decreased, a residual magnetization amount Mr is decreased to lower the reproduced output. Accordingly, the material included in the magnetic recording layer 14 is desirably selected from a standpoint of satisfying both of a decrease in the effect of the diamagnetic field (i.e., a decrease in the saturated magnetization amount Ms) and the residual magnetization amount Mr capable of providing the sufficient reproduced output. By the average composition represented by the above-described formula (1), both properties can be satisfied and a high SNR can be provided.

At least adjacent two layers among the seed layer 12, the foundation layer 13 and the magnetic recording layer 14 are desirably sequentially formed by a roll-to-roll method. More desirably, all three layers are sequentially formed by the roll-to-roll method. This is because the magnetic property and the recording and reproducing properties can be further improved.

(Protective Layer)

The protective layer 15 includes, for example, a carbon material or silicon dioxide ($SiO_2$). From a standpoint of film strength of the protective layer 15, the carbon material is desirably included. Examples of the protective layer 15 include graphite, diamond-like carbon (DLC) and diamond.

(Top Coat Layer)

The top coat layer 16 includes, for example, a lubricant. Examples of the lubricant include a silicone-based lubricant, a hydrocarbon-based lubricant and a fluorinated hydrocarbon-based lubricant.

1.3 Configuration of Sputter Apparatus

Figure 2:
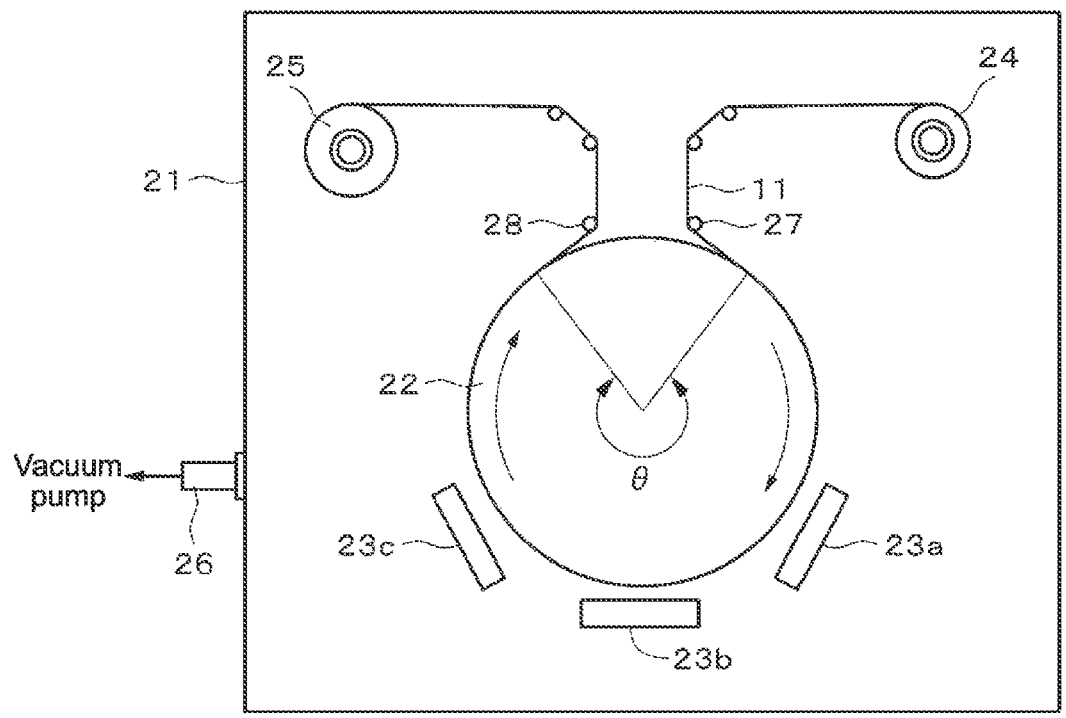
FIG. 2 is a schematic view showing a configuration example of a sputter apparatus used for producing the vertical magnetic recording medium according to the first embodiment of the present technology.

FIG. 2 is a schematic view showing a configuration example of a sputter apparatus used for producing the vertical magnetic recording medium according to the first embodiment of the present technology. The sputter apparatus is a continuous winding type sputter apparatus used for forming the seed layer 12, the foundation layer 13 and the magnetic recording layer 14. As shown in FIG. 2, the sputter apparatus includes a film forming chamber 21, a drum 22 that is a metal can (rotator), cathodes 23a to 23c, a feed reel 24, a take-up reel 25, and a plurality of guide rolls 27 and 28. The sputter apparatus is, for example, a DC magnetron sputtering apparatus, but the sputtering system is not limited thereto.

The film forming chamber 21 is connected to a vacuum pump (not shown) via an exhaust port 26. The exhaust port 26 set an atmosphere within the film forming chamber 21 to a predetermined vacuum degree. Within the film forming chamber 21, a rotatable drum 22, the feed reel 24 and the take-up reel 25 are disposed. Within the film forming chamber 21, the guide roll 27 is disposed to guide a transfer of the base 11 between the feed reel 24 and the drum 22, and the guide roll 28 is disposed to guide a transfer of the base 11 between the drum 22 and the take-up roll 25. Upon sputtering, the base 11 unwound from the feed reel 24 is taken up by the take-up reel 25 via the guide roll 27, the drum 22 and the guide roll 28. The drum 22 has a cylindrical shape, and the elongated base 11 is transferred along a periphery of the cylindrical drum 22. In the drum 22, a cooling mechanism (not shown) is disposed and is cooled at about −20° C., for example. Within the film forming chamber 21, a plurality of cathodes 23a t 23c are disposed facing to the periphery of the drum 22. Targets are set to the respective cathodes 23a to 23c. Specifically, the targets for forming the seed layer 12, the foundation layer 13 and the magnetic recording layer 14 are set to the cathodes 23a, 23b and 23c, respectively. By the cathodes 23a to 23c, a plurality types of films, i.e., the seed layer 12, the foundation layer 13 and the magnetic recording layer 14 are formed at the same time.

An atmosphere of the film forming chamber 21 upon sputtering is set to about $1 \times 10^{-5}$ Pa to $5 \times 10^{-5}$ Pa. A film thickness and properties (including a magnetic property) of each of the seed layer 12, the foundation layer 13 and the magnetic recording layer 14 can be controlled by adjusting a tape line speed for taking up the base 11, a pressure (sputter gas pressure) of Ar gas introduced upon sputtering and input power. The tape line speed is desirably within a range from about 1 m/min to 10 m/min. The sputter gas pressure is desirably within a range from about 0.1 Pa to 5 Pa. The input power is desirably within a range from about 30 mW/mm$^2$ to 150 mW/mm$^2$.

When the seed layer 12, the foundation layer 13 and the magnetic recording layer 14 are sequentially formed on the thin base 11 including the polymer material, the following film forming conditions (1) to (4) are desirably fully satisfied.
(1) The temperature of the drum 22 is desirably 10° C. or less, more desirably −20° C. or less. The temperature of the drum 22 is measured by setting a temperature sensor for a rotator utilizing a resistance temperature detector, a linear resistor and a thermistor on the drum 22.
(2) The periphery of the drum 22 is contacted with the base 11 at an angle θ of desirably 22° or more to less than 360°, more desirably 270° or more to less than 360°. The angle is specified as an angle in a circumferential direction of the cylindrical drum 22 around a center axis, as shown in FIG. 2.
(3) A tensile force of the base is desirably 4 g/mm or more, more desirably 4 g/mm or more to 20 g/mm or less per 1 mm width. The tensile force is measured by applying a load at both sides of the guide rolls 27, 28 as reference using a strain gauge transducer (a tension sensor).
(4) A maximum dynamic rate of the seed layer 12, the foundation layer 13 and the magnetic recording layer 14 is desirably 70 nm·m/min or less. The dynamic rate refers to a product of a film thickness and a feed speed.

By satisfying the above-described (1) to (4), the base 11 is prevented from damaging by radiation heat from plasma upon sputtering. Specifically, the base 11 can be prevented from partly deforming, or, in a more severe case, from severing during the film formation. When the upper limit of the tensile force is set to 20 g/mm or less as defined in the above-described film forming condition (3), the films laminated on the substrate 11 can be prevented from cracking by the tension after the magnetic tape is taken up.

By the sputtering apparatus having the above-described configurations, the seed layer 12, the foundation layer 13 and the magnetic recording layer 14 can be sequentially formed by the roll-to-toll method or non-sequentially. From a standpoint of further improving the magnetic property and the recording and reproducing property, the films are desirably sequentially formed. When the films are formed sequentially, at least adjacent two layers among the seed layer 12, the foundation layer 13 and the magnetic recording layer 14 are desirably formed by the roll-to-roll method. More desirably, all the three layers are sequentially formed by the roll-to-toll method.

Herein, the sequential film formation means that while the adjacent lower layer (the seed layer 12 or the foundation layer 13) and the upper layer (the foundation layer 13 or the magnetic recording layer 14) are formed, a surface condition of the foundation layer is not changed, in particular, any force is not applied to the surface of the foundation layer. Specifically, in the sequential film formation, by a single process where the base 11 is unwound from the feed reel 24 and is taken up by the take-up reel 25 via the drum 22, the seed layer 12, the foundation layer 13 and the magnetic recording layer 14 are sequentially formed on the surface of the moving base 11.

On the other hand, the non-sequential film formation means that while the adjacent lower layer (the seed layer 12 or the foundation layer 13) and the upper layer (the foundation layer 13 or the magnetic recording layer 14) are formed, the surface condition of the foundation layer is changed, in particular, any force is applied to the surface of the foundation layer. Specifically, the non-sequential film formation is as follows: The base 11 is unwound from the feed reel 24, the foundation layer is formed on the surface of the base 11 on the drum 22, and the base 11 is taken up by the take-up reel 25. Thereafter, the base 11 is again unwound from the take-up reel 25, the upper layer is formed on the surface of the base 11 on the drum 22, and the base 11 is taken up by the feed reel 24. In this process, when the base 11 is taken up by the take-up reel 25 and when the base 11 is unwound from the take-up reel 25, the surface of the foundation layer is in contact with the guide roll 28. When the base 11 is taken up by the take-up reel 25, the surface of the foundation layer is in contact with a rear surface of the base 11 taken-up. As such, the surface condition of the foundation layer is changed.

1.4 Method of Producing Magnetic Recording Medium

The magnetic recording medium according to the first embodiment of the present technology can be produced, for example, as described below.

Using the sputtering apparatus shown in FIG. 2, the seed layer 12, the foundation layer 13 and the magnetic recording layer 14 are formed on the base 11. Specifically, the films are formed as follows: Firstly, the film forming chamber 21 is vacuumed to a predetermined pressure. Thereafter, the targets set on the cathodes 23a to 23c are sputtered while process gas such as Ar gas is fed into the film forming chamber 21. The seed layer 12, the foundation layer 13 and the magnetic recording layer 14 are sequentially formed on the surface of the moving base 11.

In a single process where the base 11 is unwound from the feed reel 24 and is taken up by the take-up reel 25 via the drum 22, at least adjacent two layers among the seed layer 12, the foundation layer 13 and the magnetic recording layer 14 are desirably formed on the surface of the moving base 11. More desirably, all three layers are sequentially formed. When the adjacent two layers (the seed layer 12 and the foundation layer 13) are formed in the single process where the base 11 is unwound from the feed reel 24 and is taken up by the take-up reel 25 via the drum 22, the remaining one layer (the magnetic recording layer 14) is formed on the drum 22 by further steps of again unwinding the base 11 from the take-up reel 25 and taking up the base 11 by the feed reel 24.

Next, the protective layer 15 is formed on the surface of the magnetic recording layer 14. The protective layer 15 can be formed by a chemical vapor deposition (CVD) method, a physical vapor deposition (PVD) method or the like.

Next, the lubricant is applied to the surface of the protective layer 15 to form the top coat layer 16. The lubricant can be applied by a variety of coating methods including a gravure coating and a dip coating.

In this way, the magnetic recording medium shown in FIG. 1 is provided.

1.5 Advantages

The magnetic recording medium according to the first embodiment of the present technology has the following configurations and operations (1) and (2).

(1) Between the base 11 and the foundation layer 13, the seed layer 12 having an amorphous state and including an alloy of Ti and Cr is disposed. This enables the effects of $O_2$ gas and $H_2O$ adsorbed on the base 11 on the foundation layer 13 to be suppressed and the metallic smooth surface to be formed on the surface of the base 11.

(2) The percentage of Ti is set to from 30 at % to 100 at % based on a total amount of Ti and Cr contained in the seed layer 12. This enables the orientation of the (100) plane of the body-centered cubic lattice (bcc) structure of Cr to be suppressed.

By the configurations and operations (1) and (2), the orientation of the foundation layer 13 and the magnetic recording medium layer 14 can be improved and excellent magnetic property can be attained. Performances including high output and low noise of the medium can be improved.

In the magnetic recording medium according to the first embodiment, when the seed layer 12 contains impurity oxygen, the magnetic recording medium desirably has the following configuration and operation (3).

(3) The percentage of O is desirably set to 15 at % or less based on a total amount of Ti, Cr and O contained in the seed layer 12. This enables the generation of $TiO_2$ crystal to be suppressed and the effect of the foundation layer 13 formed on the surface of the seed layer 12 on crystal nucleation to be suppressed.

By the configuration and operation (3), the orientation of the foundation layer 13 and the magnetic recording medium layer 14 can be improved and excellent magnetic property can be attained even if the seed layer 12 contains impurity oxygen.

2. Second Embodiment

2.1 Configuration of Magnetic Recording Medium

Figure 3:
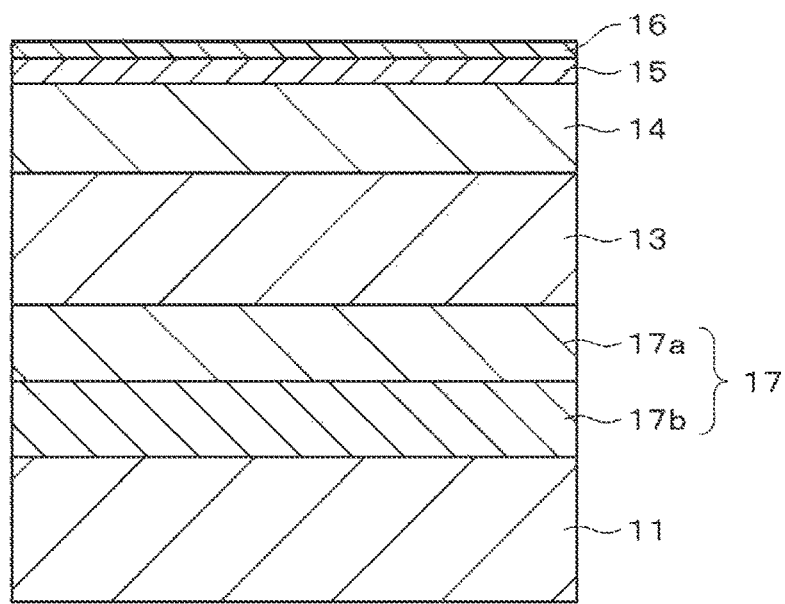
FIG. 3 is a sectional view schematically showing a configuration example of a vertical magnetic recording medium according to a second embodiment of the present technology.

FIG. 3 is a sectional view schematically showing a configuration example of a magnetic recording medium according to a second embodiment of the present technology. The magnetic recording medium according to the second embodiment is different from the magnetic recording medium according to the first embodiment in that a bilayer seed layer 17 is included as shown in FIG. 3. In the second embodiment, the same components as the first embodiment are denoted by the same reference numerals, and thus detailed description thereof will be hereinafter omitted.

The seed layer 17 includes a first seed layer (an upper seed layer) 17a and a second seed layer (a lower seed layer) 17b. The first seed layer 17a is disposed at the foundation layer 13 side, and the second seed layer 17b is disposed at the base 11 side. The second seed layer 17b can be the same as the seed layer 12 in the first embodiment. The first seed layer 17a includes a material different from that in the second seed layer 17b. Examples of the material include NiW, Ta or the like. It is possible to consider the first seed layer 17a not as the seed layer, but as an intermediate layer disposed between the second seed layer 17b and the foundation layer 13.

2.2 Advantages

When the magnetic recording medium includes the bilayer seed layer 17, the orientation of the foundation layer 13 and the magnetic recording medium layer 14 can be further improved and the magnetic property can be further enhanced.

3. Third Embodiment

3.1 Configuration of Magnetic Recording Medium

Figure 8:
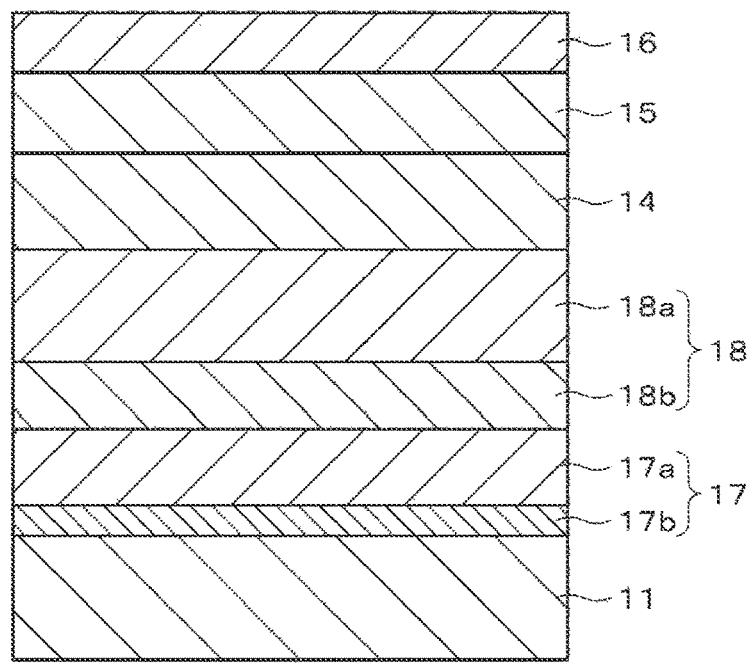
FIG. 8 is a sectional view schematically showing a configuration example of a vertical magnetic recording medium according to a third embodiment of the present technology.

FIG. 8 is a sectional view schematically showing a configuration example of a vertical magnetic recording medium according to a third embodiment of the present technology. The magnetic recording medium according to the third embodiment is different from the magnetic recording medium according to the second embodiment in that a bilayer foundation layer 18 is included as shown in FIG. 8. In the third embodiment, the same components as the second embodiment are denoted by the same reference numerals, and thus detailed description thereof will be hereinafter omitted.

The foundation layer 18 includes a first foundation layer (an upper foundation layer) 18a and a second foundation layer (a lower foundation layer) 18b. The first foundation layer 18a is disposed at the magnetic recording layer 14 side, and the second foundation layer 18b is disposed at the seed layer 17 side.

The first foundation layer 18a and the second foundation layer 18b can be the same material as that of the foundation layer 13 in the first embodiment. However, the first foundation layer 18a and the second foundation layer 18b have different advantages to be intended. Therefore, the sputtering conditions for the first foundation layer 18a and the second foundation layer 18b are different. In other words, it is important that the first foundation layer 18a has a film structure to promote the granular structure of the magnetic recording medium that will be the upper layer thereof. It is important that the second foundation layer 18b has a film structure having high crystal orientation.

3.2 Advantages

When the magnetic recording medium includes the bilayer foundation layer 18, the orientation and the granular structure of the magnetic recording medium layer 14 can be further improved and the magnetic property can be further enhanced.

3.3 Modification Embodiment

In the magnetic recording medium according to the third embodiment, a monolayer seed layer may be included instead of the bilayer seed layer 17. As the monolayer seed layer, the seed layer 12 according to the first embodiment can be used.

4. Fourth Embodiment

4.1 Configuration of Magnetic Recording Medium

Figure 9:
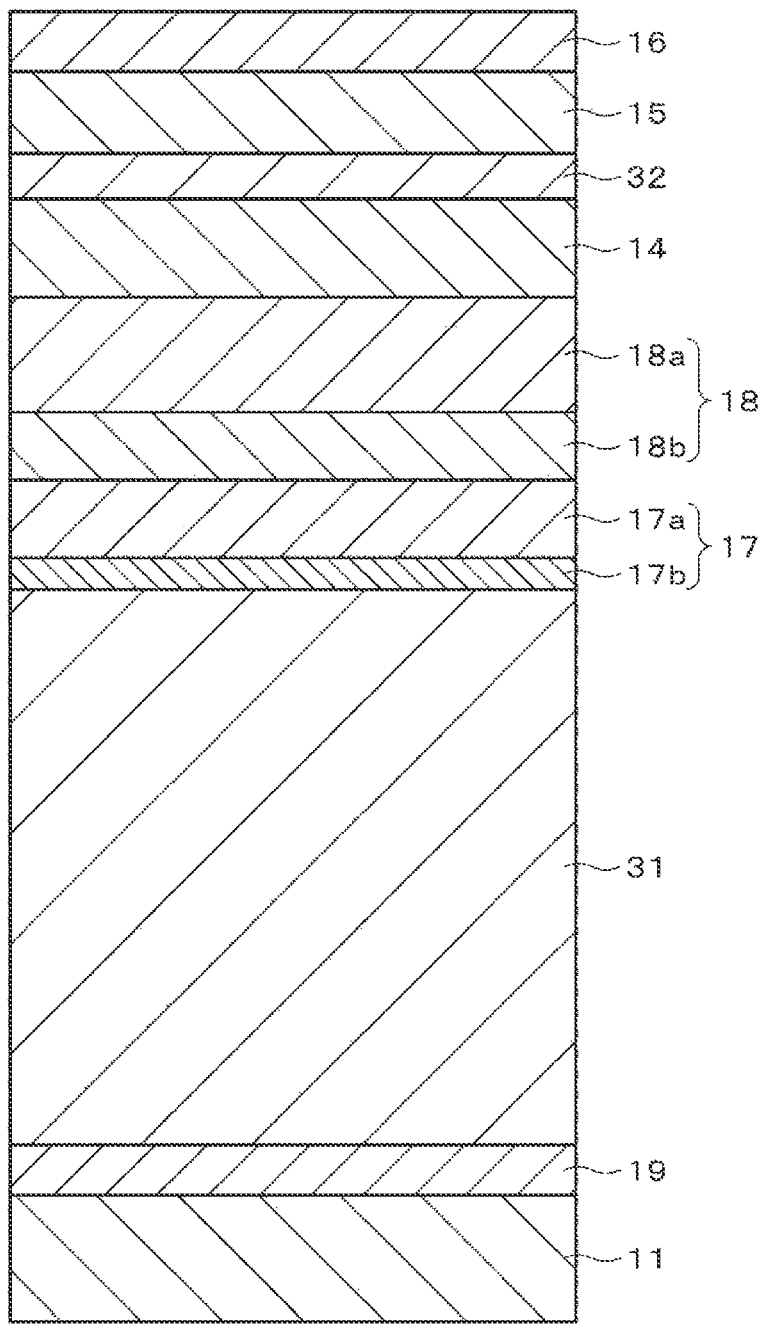
FIG. 9 is a sectional view schematically showing a configuration example of a vertical magnetic recording medium according to a fourth embodiment of the present technology.

FIG. 9 is a sectional view schematically showing a configuration example of a magnetic recording medium according to a fourth embodiment of the present technology. The magnetic recording medium according to the fourth embodiment is a so-called bilayer vertical magnetic recording medium. As shown in FIG. 9, the magnetic recording medium according to the fourth embodiment is different from the magnetic recording medium according to the third embodiment in that a seed layer 19 and a soft magnetic underlayer (hereinafter referred to as "SUL") 31 are included between the base 11 and the seed layer 17. The seed layer 19 is disposed at the base 11 side, and the SUL 31 is disposed at the seed layer 17 side. The magnetic recording medium according to the fourth embodiment is desirably used in a recording and reproducing apparatus using a single pole type (SPT) recording head and a tunnel magnetoresistive (TMR) type reproducing head. In the fourth embodiment, the same components as the third embodiment are denoted by the same reference numerals, and thus detailed description thereof will be hereinafter omitted.

As the seed layer 19, the seed layer 12 according to the first embodiment can be used.

A film thickness of the SUL 31 is desirably 40 nm or more, more desirably 40 nm to 140 nm. If the film thickness is less than 40 nm, the recording and reproducing properties may be decreased. On the other hand, if the film thickness exceeds 140 nm, crystal orientation of the foundation layer 18 is significantly decreased due to crystal grain coarsening of the SUL film, and a time to form the SUL 31 is prolonged, which may result in a low productivity. The SUL 31 includes a soft magnetic material in an amorphous state. As the soft magnetic material, a Co-based material or a Fe-based material can be used. Examples of the Co-based material include CoZrNb, CoZrTa, CoZrTaNb and the like. Examples of the Fe-based material include FeCoB, FeCoZr, FeCoTa and the like.

As the SUL 31 has the amorphous state, the SUL 31 does not take a role to promote an epitaxial growth of a layer formed on the SUL 31, but should not disturb the crystal orientation of the foundation layer 18 formed on the SUL 31. For this purpose, the soft magnetic material should have a fine structure such that no column is formed. If degassing by moisture from the base 11 has high impact, the soft magnetic material is coarsened and the crystal orientation of the foundation layer 18 formed on the SUL 31 may be disturbed. In order to suppress the impact, it becomes important to dispose the seed layer 19 on the surface of the base 11. Especially when a polymer material film where gas including moisture and oxygen is often adsorbed is used as the base 11, it becomes important to dispose the seed layer 19 in order to suppress the impact.

Desirably, a CAP layer (a stack layer) 32 is further provided between the recording layer 14 and the protective layer 15. A lamination structure including the magnetic recording layer 14 having the granular structure and the CPA layer 32 is generally called as a coupled granular continuous (CGC). A film thickness of the CAP layer 32 is desirably 4 nm to 12 nm. When the film thickness of the CAP layer 32 is selected within the range between 4 nm to 12 nm, there can be provided better recording and reproducing properties. The CAP layer 32 includes a CoCrPt-based material. Examples of the CoCrPt-based material include CoCrPt, CoCrPtB, a material provided by adding a metal oxide thereto (a CoCrPt-metal oxide, a CoCrPtB-metal oxide) and the like. As the metal oxide added, at least one selected from the group of Si, Ti, Ma, Ta and Cr can be used. Specific examples include $SiO_2$, $TiO_2$, MgO, $Ta_2O_5$, $Cr_2O_3$ and a mixture of two or more thereof.

In the magnetic recording medium according to the fourth embodiment, all of the seed layer 19, the SUL 31, the first and second seed layers 17a and 17b, the first and second foundation layers 18a and 18b and the magnetic recording layer 14 are desirably sequentially formed by a roll-to-roll method. This is because the magnetic property and the recording and reproducing properties can be further improved.

4.2 Advantages

In the magnetic recording medium according to the fourth embodiment, the SUL 31 is disposed under the magnetic recording layer 14 which is a vertical magnetic layer. Thus, a magnetic pole generated on a surface layer of the magnetic recording medium 14 is decreased to suppress a magnetic field, and a head magnetic flux is guided into the SUL 31 to help a generation of a sharp head magnetic flux. In addition, the seed layer 19 is disposed between the base 11 and the SUL 31, thereby suppressing coarsening of the soft magnetic material contained in the SUL 31. In other words, disturbance of the crystal orientation in the foundation layer 18 can be suppressed. Accordingly, as the magnetic recording medium has a higher surface recording density than that in the first embodiment, better recording and reproducing properties can be provided.

When a structure having the CAP layer 32 formed on the magnetic recording layer 14 having the granular structure is used, a magnetic connection is produced by an exchange interaction between the magnetic recording layer 14 and the CAP layer 32. This allows a slope of an M-H loop near Hc to be steep, whereby recording is easily carried out. In general, when the slope of the M-H loop is steep only in the magnetic recording layer 14, an increase in a noise is observed. However, by the above-described structure, a noise can be kept low even though a noise is generated. In this way, recording can be easily carried out with a low noise.

4.3 Modification Embodiment

In the magnetic recording medium according to the fourth embodiment, a monolayer seed layer may be used instead of the bilayer seed layer 17. As the monolayer seed layer, the seed layer 12 in the first embodiment can be used. In addition, a monolayer foundation layer may be included instead of the bilayer foundation layer 18. As the monolayer foundation layer, the foundation layer 13 in the first embodiment can be used.

5. Fifth Embodiment

5.1 Configuration of Magnetic Recording Medium

Figure 10:
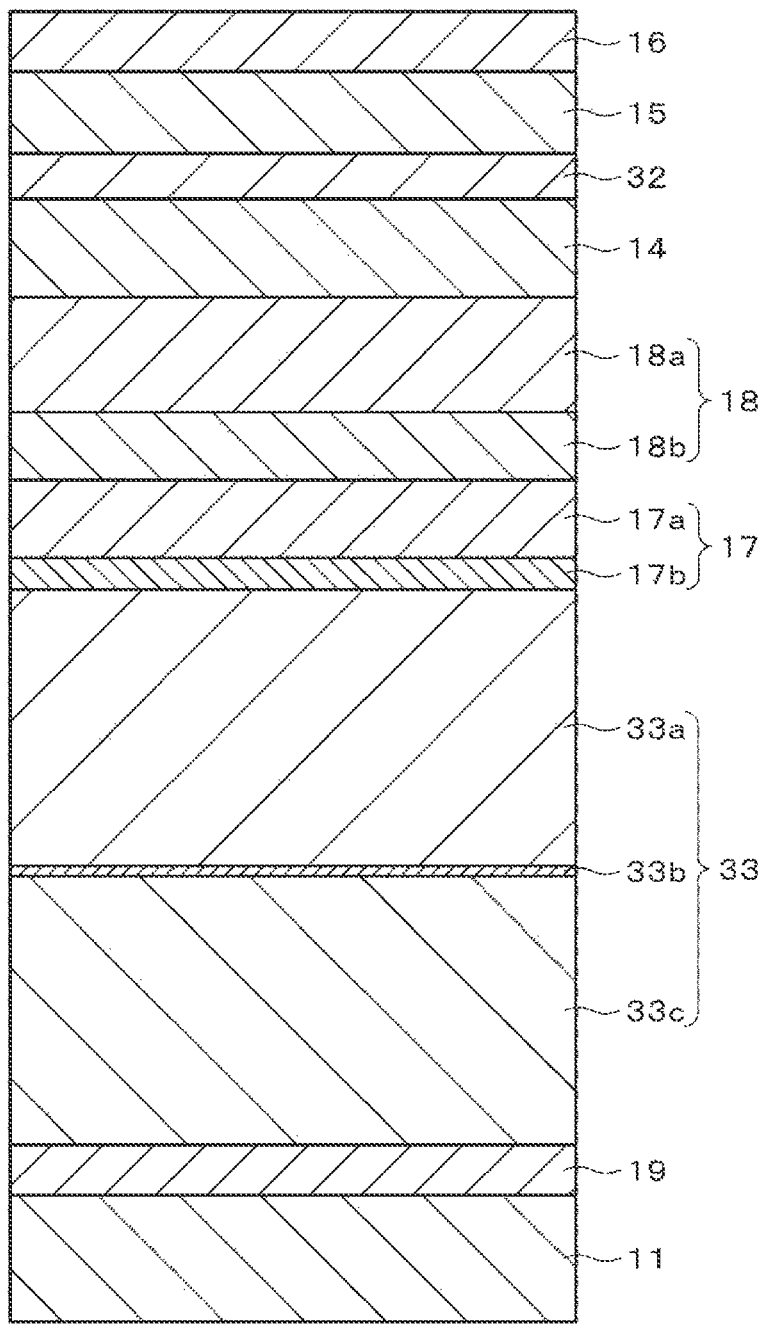
FIG. 10 is a sectional view schematically showing a configuration example of a vertical magnetic recording medium according to a fifth embodiment of the present technology.

FIG. 10 is a sectional view schematically showing a configuration example of a vertical magnetic recording medium according to a fifth embodiment of the present technology. The magnetic recording medium according to the fifth embodiment is different from the magnetic recording medium according to the fourth embodiment in that an antiparallel coupled SUL (hereinafter referred to as "APC-SUL") 33 is included as shown in FIG. 10. In the fifth embodiment, the same components as the first embodiment are denoted by the same reference numerals, and thus detailed description thereof will be hereinafter omitted.

The APC-SUL 33 includes two soft magnetic layers 33a and 33c laminated via a thin intermediate layer 33b, and utilizes an exchange coupling via the intermediate layer 33b to positively couple magnetization in an antiparallel fashion. Film thicknesses of the soft magnetic layers 33a and 33c are desirably substantially the same. A total film thickness of the soft magnetic layers 33a and 33c is desirably 40 nm or more, more desirably 40 nm to 70 nm. If the total film thickness is less than 40 nm, the recording and reproducing properties may be decreased. On the other hand, if the total film thickness exceeds 70 nm, a time to form the APC-SUL 33 is prolonged, which may result in a low productivity. The soft magnetic layers 33a and 33c are desirably made of the same material. The material of the soft magnetic layers 33a and 33c can be the same as that of the SUL 31 in the fourth embodiment. A film thickness of the intermediate layer 33b is, for example, 0.8 nm to 1.4 nm, desirably 0.9 nm to 1.3 nm, more desirably about 1.1 nm. When the film thickness of the intermediate layer 33b is selected within the range between 0.9 nm to 1.3 nm, there can be provided better recording and reproducing properties. Examples of the intermediate layer 33b include V, Cr, Mo, Cu, Ru, Rh and Re, most desirably, Ru.

5.2 Advantages

In the magnetic recording medium according to the fifth embodiment, the APC-SUL 33 is used. The upper soft magnetic layer 33a and the lower soft magnetic layer 33c are exchange-coupled in the antiparallel fashion. A total magnetization of the upper and lower layers equals to zero under residual magnetization. In this way, a spike-shaped noise generated when a magnetic domain in the APC-SUL 33 is moved can be suppressed. Accordingly, the magnetic property and the recording and reproducing properties can be further improved.

5.3 Modification Embodiment

In the magnetic recording medium according to the fifth embodiment, the monolayer seed layer and/or foundation layer may be included as in the magnetic recording medium in the modification embodiment of the fourth embodiment.

Example

Hereinafter, examples of the present technology will be described. It should be noted that the present technology is not limited the examples described below.

The examples of the present technology will be described in the following order.
i. Study on Magnetic Tape having no Soft Magnetic Underlayer (SUL)
ii. Study on Magnetic Tape having Soft Magnetic Underlayer (SUL)

i. Study on Magnetic Tape Having No Soft Magnetic Underlayer (SUL)

Example 1

Film Forming Process of Seed Layer

A TiCr seed layer was formed at a thickness of 5 nm on a polymer film used as a non-magnetic base under the following film formation conditions:
  Sputtering system: DC magnetron sputtering system
  Target: $Ti_{30}Cr_{70}$ target
  Ultimate vacuum degree: $5\times10^{-5}$ Pa
  Gas type: Ar
  Gas pressure: 0.5 Pa
(Film Forming Process of Foundation Layer)
  Next, a Ru foundation layer was formed at a thickness of 20 nm on the TiCr seed layer under the following film formation conditions:
  Sputtering system: DC magnetron sputtering system
  Target: Ru target
  Gas type: Ar
  Gas pressure: 1.5 Pa
(Film Forming Process of Magnetic Recording Layer)
  Next, a (CoCrPt)—($SiO_2$) magnetic recording layer was formed at a thickness of 20 nm on the Ru foundation layer under the following film formation conditions:
  Sputtering system: DC magnetron sputtering system
  Target: $(Co_{75}Cr_{10}Pt_{15})_{90}$—$(SiO_2)_{10}$ target
  Gas type: Ar
  Gas pressure: 1.5 Pa
(Film Forming Process of Protective Layer)
  Next, a carbon protective layer was formed at a thickness of 5 nm on the (CoCrPt)—($SiO_2$) magnetic recording layer under the following film formation conditions:
  Sputtering system: DC magnetron sputtering system
  Target: carbon target
  Gas type: Ar
  Gas pressure: 1.0 Pa
(Film Forming Process of Top Coat Layer)
  Next, a lubricant was applied to the protective layer to form a top coat layer on the protective layer.
  In the above-described way, a magnetic tape which is the vertical magnetic recording medium was provided.

Example 2

A magnetic tape was provided similar to Example 1 except that the film formation conditions in the film forming process of the seed layer were changed as follows:
  Sputtering system: DC magnetron sputtering system
  Target: $Ti_{30}Cr_{70}$ target
  Ultimate vacuum degree: $1\times10^{-5}$ Pa
  Gas type: Ar
  Gas pressure: 0.5 Pa

Example 3

A magnetic tape was provided similar to Example 1 except that the film formation conditions in the film forming process of the seed layer were changed as follows:
  Sputtering system: DC magnetron sputtering system
  Target: $Ti_{40}Cr_{60}$ target
  Ultimate vacuum degree: $1\times10^{-5}$ Pa
  Gas type: Ar
  Gas pressure: 0.5 Pa

Example 4

A magnetic tape was provided similar to Example 1 except that the film formation conditions in the film forming process of the seed layer were changed as follows:
Sputtering system: DC magnetron sputtering system
Target: $Ti_{50}Cr_{50}$ target
Ultimate vacuum degree: $1 \times 10^{-5}$ Pa
Gas type: Ar
Gas pressure: 0.5 Pa

Example 5

A magnetic tape was provided similar to Example 4 except that the film formation conditions in the film forming process of the magnetic recording layer were changed as follows:
Sputtering system: DC magnetron sputtering system
Target: $(Co_{70}Cr_{15}Pt_{15})_{90}$—$(SiO_2)_{10}$ target
Gas type: Ar
Gas pressure: 1.5 Pa

Comparative Example 1

A magnetic tape was provided similar to Example 1 except that the foundation layer was directly formed on the polymer film as the non-magnetic base without the film forming process of the seed layer.

Comparative Example 2

A magnetic tape was provided similar to Example 1 except that the TiCr seed layer was formed at a thickness of 40 nm by adjusting the film formation conditions in the film forming process of the seed layer.

Comparative Example 3

A magnetic tape was provided similar to Example 1 except that the film formation conditions in the film forming process of the seed layer were changed as follows:
Sputtering system: DC magnetron sputtering system
Target: $Ti_{30}Cr_{70}$ target
Ultimate vacuum degree: $1 \times 10^{-4}$ Pa
Gas type: Ar
Gas pressure: 0.5 Pa

Comparative Example 4

A magnetic tape was provided similar to Example 1 except that the film formation conditions in the film forming process of the seed layer were changed as follows:
Sputtering system: DC magnetron sputtering system
Target: $Ti_{20}Cr_{80}$ target
Ultimate vacuum degree: $1 \times 10^{-5}$ Pa
Gas type: Ar
Gas pressure: 0.5 Pa (Properties Evaluation)

The magnetic tapes in Examples 1 to 5 and Comparative Examples 1 to 4 provided as described above were evaluated by the following items (a) to (f):

(a) Vertical Orientation of Foundation Layer $\theta/2\theta$ was determined using an X ray diffraction apparatus to evaluate vertical orientation of Ru included in each foundation layer based on the following scales:

Good vertical orientation: only peaks at (0002) were observed

Bad vertical orientation: peaks at (10-10) and (10-11) were observed in addition to the peaks at (0002).

Here, "-1" in the above-described crystal orientation means overlined "1".

(b) State of Seed Layer

A state of each TiCr seed layer was analyzed by an electron diffraction method. In the electron diffraction method, dots are displayed as an electron diffraction image when the TiCr seed layer was in a crystal state, rings are displayed as an electron diffraction image when the TiCr seed layer was in a polycrystalline state, and halos are displayed as an electron diffraction image when the TiCr seed layer was in an amorphous state.

(c) Composition of Seed Layer

A composition of each seed layer was analyzed. A surface layer of each sample was etched by an ion beam. An outermost surface etched was analyzed by the Auger electron spectroscopy to provide an average atomic number ratio to a film thickness as a ratio of each element. Specifically, three elements, Ti, Cr and O were analyzed to identify element contents by a percentage ratio.

Hereinafter, the Auger electron spectroscopy will be described. The Auger electron spectroscopy is an analysis method to identify types and amounts of the elements on a solid surface by irradiating the solid surface with thinly focused electron beam and measuring energy and numbers of Auger electrons generated. The energy of the Auger electrons discharged depends on energy discharged when electrons are dropped from an outer shell level to an empty level generated by the electron beam irradiated to the surface, and has an intrinsic value of each element, which can be specified on the sample surface.

(d) Composition of Magnetic Recording Layer

A composition of each magnetic recording layer was analyzed as follows: Similar to the above-described "(c) Composition of Seed Layer", an analysis was made by the Auger electron spectroscopy to provide an average atomic number ratio to a film thickness as a ratio of each element. Specifically, five elements, Co, Pt, Cr, Si and O are analyzed to identify element contents by a percentage ratio.

(e) Magnetic Property of Magnetic Recording Layer

The magnetic property of the magnetic recording layer was determined in a vertical direction using a vibrating sample magnetometer (VSM).

(f) Recording and Reproducing Properties

Recording and reproducing properties were evaluated as follows: Firstly, using a ring shaped recording head and a giant magnetoresistive (GMR) type reproducing head, a so-called drag tester that carries out recording and reproducing by oscillating back and forth the heads by a piezo stage was used for measurement. A read track width of the reproducing head was 120 nm. Next, by setting a recording wave length to 250 kFCI (kilo flux change per inch), the SNRs were calculated and determined by a ratio of a peak-to-peak voltage of a reproducing waveform and a voltage determined by an integrated value of a noise spectrum within a band width of 0 kFCI to 500 kFCI. Next, the SNRs determined were evaluated by three stages based on the following scales. Table 1 shows the results. In the Table 1, "Excellent", "Good" and "Bad" were based on the following:

Excellent: SNR is 23 dB or more
Good: SNR is from not less than 20 dB to less than 23 dB
Bad: SNR is less than 20 dB In general, a minimum requisite SNR for a recording and reproducing system is said to be about 16 dB for the SNR provided after waveform equalization and error correction (so-called a digital SNR). The digital SNR is about 4 dB lower than the SNR used in this measurement (used for the evaluation of the above-described recording and reproducing properties). Therefore, in order to ensure 16 dB for the digital SNR, the SNR used in this measurement calls for 20 dB. Accordingly, about 20 dB may be necessary as the minimum requisite SNR in this measurement. In addition, in view of an output decrease due to sliding between the magnetic tape and the magnetic head and a decrease of practical properties, an extra margin for the SNR is desirably set. Taking the margin into consideration, the SNR may be desirably 23 dB or more.

In each magnetic tape according to the embodiment, a linear recording density is 500 kBPI (bit per inch) and a track density is 106 kTPI (tracks per inch) by setting a track pit as two times greater than a track width of the reproducing head. As a result, a surface recording density, 500 kBPI×106 kTPI=53 Gb/in$^2$, can be provided.

(Evaluation Results)

Figure 4:
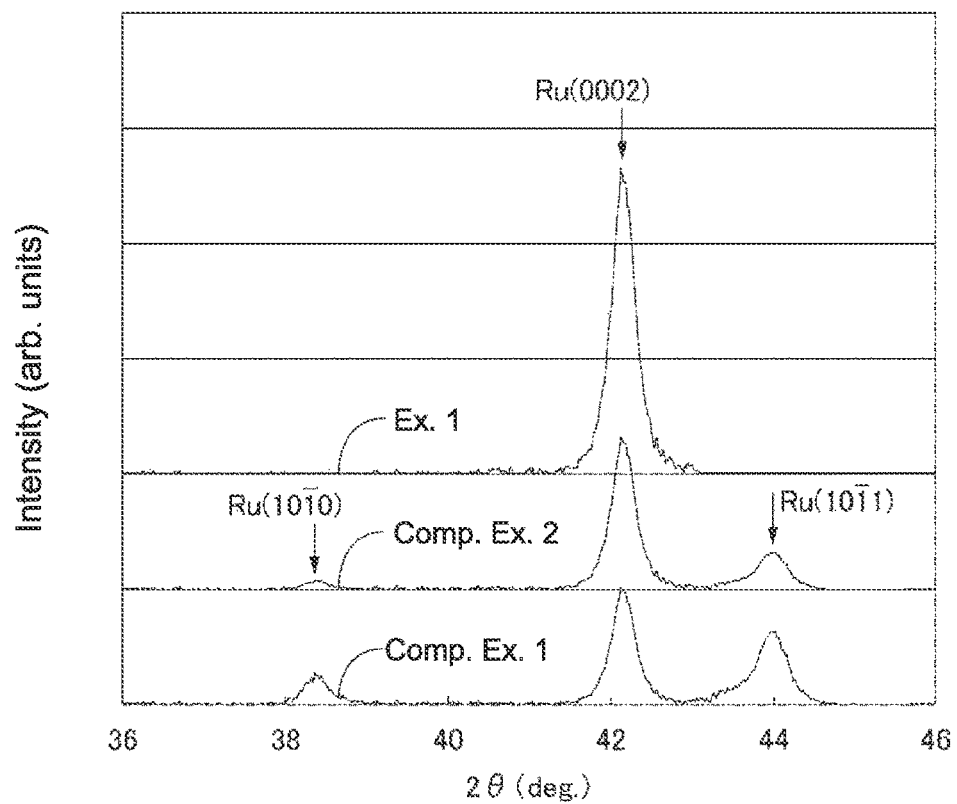
FIG. 4 is a graph showing results of X ray diffraction of foundation layers of magnetic tapes in Example 1 and Comparative Examples 1 and 2.
Figure 5:
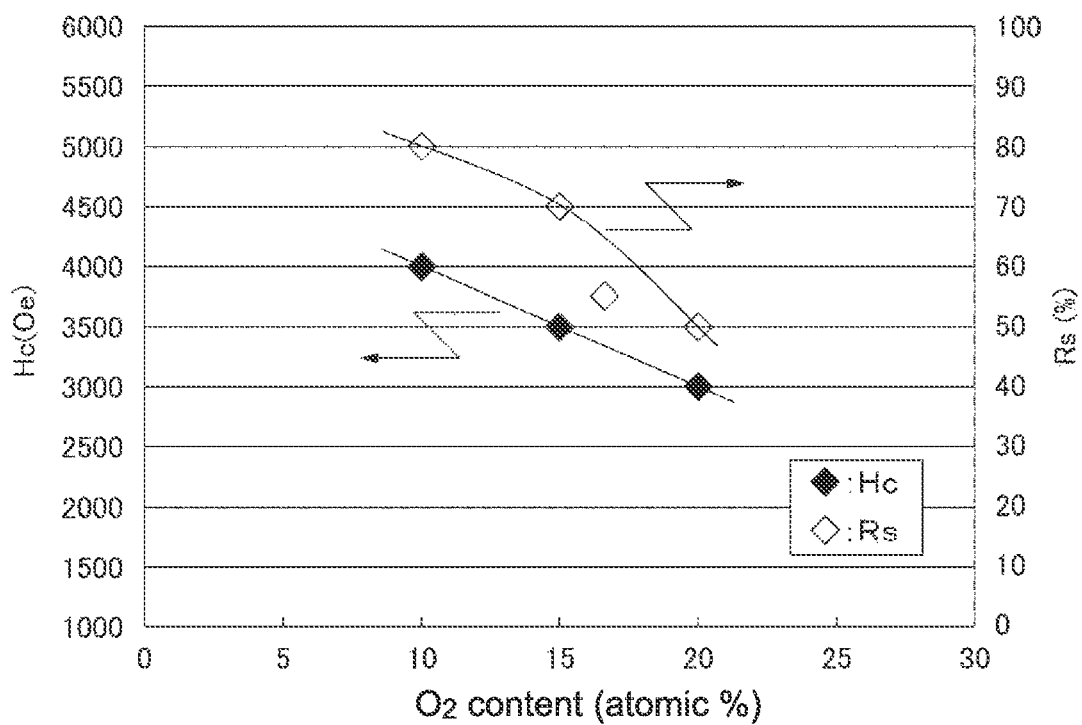
FIG. 5 is a graph showing a dependency of a magnetic property on oxygen contents in seed layers of the magnetic tapes in Examples 1 and 2 and Comparative Example 3.
Figure 6:
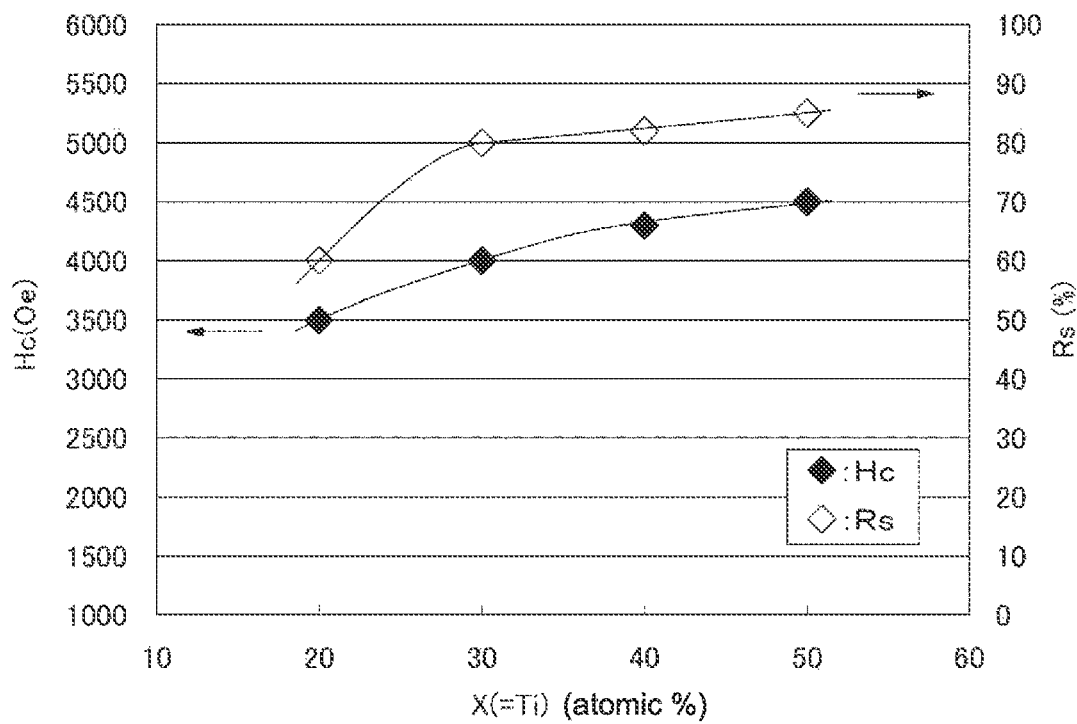
FIG. 6 is a graph showing a dependency of a magnetic property on Ti contents in seed layers of the magnetic tapes in Examples 2 to 4 Comparative Example 4.
Figure 7:
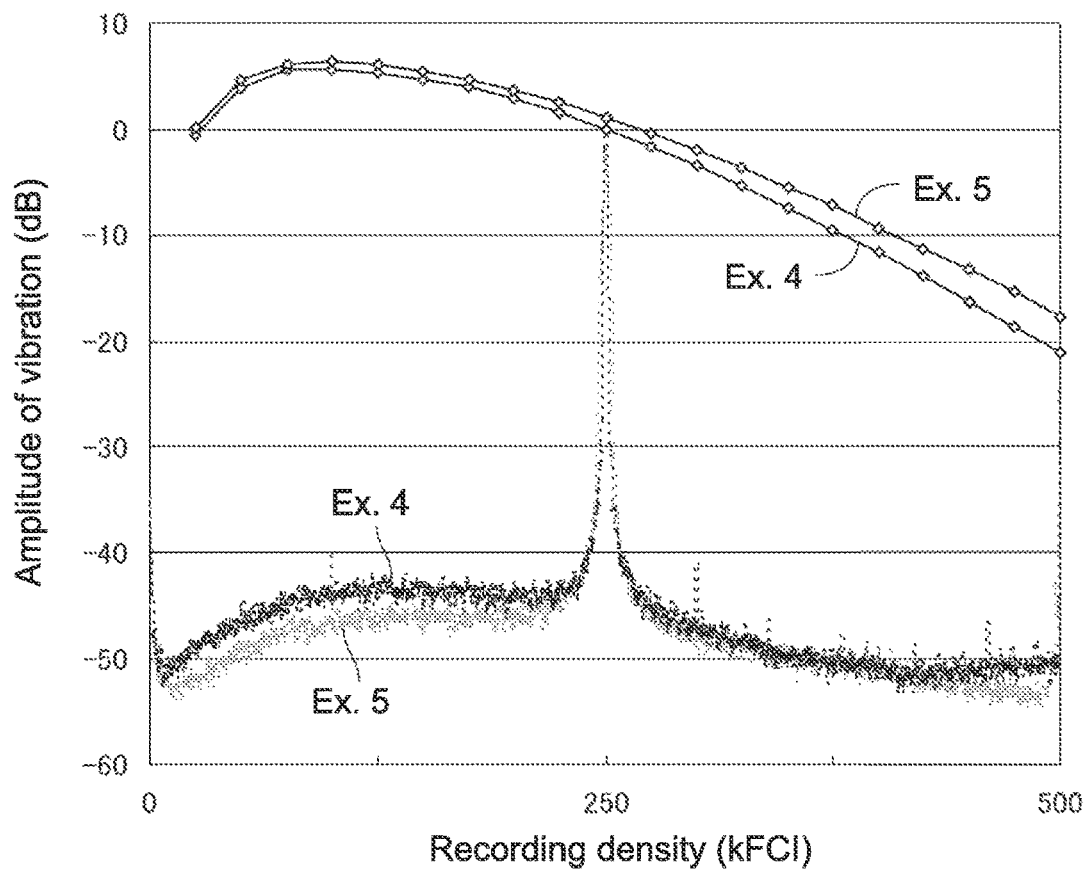
FIG. 7 is a graph showing recording and reproducing properties of magnetic tapes in Examples 4 and 5.

FIG. 4 is a graph showing results of the X ray diffraction of the foundation layers of magnetic tapes in Example 1 and Comparative Examples 1 and 2. FIG. 5 is a graph showing a dependency of the magnetic property on oxygen contents in the seed layers of the magnetic tapes in Examples 1 and 2 and Comparative Example 3. FIG. 6 is a graph showing a dependency of the magnetic property on Ti contents in the seed layers of the magnetic tapes in Examples 2 to 4 Comparative Example 4. FIG. 7 is a graph showing the recording and reproducing properties of the magnetic tapes in Examples 4 and 5.

Table 1 shows the configurations and results of the evaluations (a) to (f) of the magnetic tapes in Examples 1 to 5 and Comparative Examples 1 to 4.

firmed. Specifically, in Comparative Example 2, the TiCr seed layer was in the crystal orientation state.

The oxygen content of the TiCr seed layer in Example 1 was 15 atomic %. In contrast, the oxygen content of each TiCr seed layer in Examples 2 to 5 and Comparative Example 4 was decreased to 10 atomic %. The decrease in the oxygen content of the TiCr seed layer may be because the atmosphere of the film forming chamber was changed from $5\times10^{-5}$ Pa to $1\times10^{-5}$ Pa in each Examples 2 to 5 and Comparative Example 4 and the TiCr seed layer was suppressed from being oxidized by exposure.

The oxygen content of the TiCr seed layer in Example 1 was 15 atomic %. In contrast, the oxygen content of the TiCr seed layer in Comparative Example 3 was increased to 20 atomic %. The increase in the oxygen content of the TiCr seed layer may be because the atmosphere of the film forming chamber was changed from $5\times10^{-5}$ Pa to $1\times10^{-4}$ Pa in Comparative Example 3 and the TiCr seed layer was promoted to be oxidized by exposure.

About the Foundation Layers

In Example 1, the vertical orientation of the Ru foundation layer was determined. As shown in FIG. 4, the (10-10) and (10-11) peaks were not observed, and only a (0002) peak representing the vertical orientation of the c axis in the hexagonal close-packed (hcp) structure was observed. Thus, when the TiCr seed layer in the amorphous state was disposed between the non-magnetic base and the Ru foundation layer, it turned out that the vertical orientation of the Ru foundation layer was significantly improved.

In Comparative Example 1, the vertical orientation of the Ru foundation layer was determined. As shown in FIG. 4, the (0002) peak representing the vertical orientation of the hexagonal close-packed (hcp) structure was low, and the

TABLE 1

| | Seed layer ($Ti_xCr_{100-x}$) | | | Foundation layer | Average composition of recording layer $(Co_xPt_yCr_{100-x-y})_{100-z}$—$(SiO_2)_z$ | | | Properties | | | |
|---|---|---|---|---|---|---|---|---|---|---|---|
| | | | Oxygen | | | | | Magnetic properties | | Recording and reproducing properties | |
| | Seed layer | State | content (at %) | x (at %) | Orientation state | x (at %) | y (at %) | z (at %) | Hc ⊥ (Oe) | Rs ⊥ (%) | SNR (dB) | Evaluation |
| Ex. 1 | ✓ | Amorphous | 15 | 30 | Good | 75 | 15 | 10 | 3500 | 70 | 20 | Good |
| Ex. 2 | ✓ | Amorphous | 10 | 30 | Good | 75 | 15 | 10 | 4000 | 80 | 21 | Good |
| Ex. 3 | ✓ | Amorphous | 10 | 40 | Good | 75 | 15 | 10 | 4300 | 82 | 22 | Good |
| Ex. 4 | ✓ | Amorphous | 10 | 50 | Good | 75 | 15 | 10 | 4500 | 85 | 23 | Excellent |
| Ex. 5 | ✓ | Amorphous | 10 | 50 | Good | 70 | 15 | 10 | 4500 | 85 | 25 | Excellent |
| Comp. Ex. 1 | — | — | — | — | Bad | 75 | 15 | 10 | 2500 | 30 | Less than 20 | Bad |
| Comp. Ex. 2 | ✓ | hcp (002) | 15 | 30 | Bad | 75 | 15 | 10 | 2800 | 40 | Less than 20 | Bad |
| Comp. Ex. 3 | ✓ | Amorphous | 20 | 30 | Bad | 75 | 15 | 10 | 3000 | 50 | Less than 20 | Bad |
| Comp. Ex. 4 | ✓ | Amorphous | 10 | 20 | Bad | 75 | 15 | 10 | 3500 | 60 | Less than 20 | Bad |

About the Seed Layers

In Examples 1 to 5 and Comparative Examples 3 and 4, each TiCr seed layer was analyzed by the electron diffraction method. As a result, no diffraction spots were observed, and a halo state was confirmed. Specifically, in Examples 1 to 5 and Comparative Examples 3 and 4, each TiCr seed layer was not crystallized and was in the amorphous state.

In Comparative Example 2, the TiCr seed layer was analyzed by the electron diffraction method. As a result, a diffraction spot representing the body-centered cubic lattice (bcc) structure of Cr and a diffraction spot representing the hexagonal close-packed (hcp) structure of Ti were con- (10-10) and (10-11) peaks were observed. Thus, when no TiCr seed layer in the amorphous state was disposed between the non-magnetic base and the Ru foundation layer, it turned out that the vertical orientation of the Ru foundation layer became random, and no sufficient vertical orientation was provided.

In Comparative Example 2, the vertical orientation of the Ru foundation layer was determined. As shown in FIG. 4, the (0002) peak representing the vertical orientation of the hexagonal close-packed (hcp) structure and the (10-10) and (10-11) peaks were observed. Thus, the TiCr seed layer in the crystal state was disposed between the non-magnetic base and the Ru foundation layer, it turned out that no sufficient vertical orientation was provided.

About the Medium Properties

In Example 1, coercivity Hc was 3500 Oe and gradation Rs was 70%. It turned out that the magnetic property was significantly improved and the vertical orientation was increased as compared to those in Comparative Example 2. In Example 3, the SNR was 22 dB. It turned out that the recording and reproducing properties could be improved as compared to those in Comparative Example 2.

In Example 2, coercivity Hc was 4000 Oe and gradation Rs was 80%. It turned out that the magnetic property was significantly improved and the vertical orientation was increased as compared to those in Example 1. In Example 2, the SNR was 21 dB. It turned out that the recording and reproducing properties could be improved as compared to those in Example 1. Such property improvement may be because the oxygen content of the TiCr seed layer was decreased to 10 atomic % in Example 2.

In Example 3, coercivity Hc was 4300 Oe and gradation Rs was 82%. It turned out that the magnetic property was significantly improved and the vertical orientation was increased as compared to those in Example 2. In Example 3, the SNR was 22 dB which was 1 dB higher than Example 2. It turned out that the recording and reproducing properties could be improved as compared to those in Example 2. Such property improvement may be because the Ti content of the TiCr seed layer was increased to 40 atomic %.

In Example 4, coercivity Hc was 4500 Oe and gradation Rs was 85%. It turned out that the magnetic property was further improved as compared to those in Example 3. In Example 4, the SNR was 23 dB. It turned out that the SNR was sufficient to provide the recording density of 50 Gb/in$^2$. Such property improvement may be because the Ti content was increased to 50 atomic %.

In Example 5, coercivity Hc was 4500 Oe and gradation Rs was 85%. It turned out that the magnetic property similar to those in Example 3 was provided. In addition, the SNR was 25 dB in Example 5. It turned out that the SNR was further improved as compared to that in Example 4. This may be because the saturated magnetization amount Ms was further decreased within a desirable range by changing the composition ratio in the magnetic recording layer, and the exchange interaction between the column particles was decreased which resulted in low noise.

In Comparative Example 1, coercivity Hc was 2500 Oe and gradation Rs was 30%. It turned out that no sufficient vertical orientation was provided. In addition, the SNR was less than 20 dB in Comparative Example 1. The decrease in the properties may be because no TiCr seed layer was disposed between the non-magnetic base and the Ru foundation layer in Comparative Example 1.

In Comparative Example 2, coercivity Hc was 2800 Oe and gradation Rs was 40%. It turned out that some improvement was shown as compared to Comparative Example 1, but no sufficient vertical orientation was provided. In addition, the SNR was less than 20 dB in Comparative Example 2. The decrease in the properties may be because the TiCr seed layer was in the crystal state in Comparative Example 2.

In Comparative Example 3, coercivity Hc was 3000 Oe and gradation Rs was 50%. It turned out that the magnetic property was decreased and the vertical orientation was especially decreased as compared to those in Example 1. In addition, the SNR was less than 20 dB in Comparative Example 3. The decrease in the properties may be because the oxygen content was increased to more than 15 atomic % in Comparative Example 3.

In Comparative Example 4, coercivity Hc was 3500 Oe and gradation Rs was 60%. It turned out that the magnetic property was decreased and the vertical orientation was especially decreased as compared to those in Example 2. The decrease in the properties may be because the Ti content was decreased to less than 30 atomic % in the TiCr seed layer in Comparative Example 3.

In view of the above, it is desirable that the seed layer in the amorphous state be disposed between the non-magnetic base and the foundation layer, the percentage of Ti be limited to a range from 30 atomic % to 100 atomic % based on a total amount of Ti and Cr contained in the seed layer, and the percentage of O be limited to 15 atomic % or less based on a total amount of Ti, Cr and O contained in the seed layer in order to improve the magnetic property and the recording and reproducing properties.

Also, it is desirable that the seed layer in the amorphous state be disposed between the non-magnetic base and the foundation layer, the percentage of Ti be limited to a range from 30 atomic % to 100 atomic % based on a total amount of Ti and Cr contained in the seed layer, and the percentage of the impurity oxygen contained in the seed layer be almost 0 atomic % or set to lower than a detection limit by an instrumental analysis (the Auger electron spectroscopy) based on a total amount of Ti, Cr and O contained in the seed layer in order to improve the magnetic property and the recording and reproducing properties.

ii. Study on Magnetic Tape Having Soft Magnetic Underlayer (SUL)

Examples 6 to 9

Film Forming Process of First TiCr Seed Layer

A first TiCr seed layer was formed at a thickness of 5 nm on a polymer film used as a non-magnetic base under the following film formation conditions:
Sputtering system: DC magnetron sputtering system
Target: Ti$_{50}$Cr$_{50}$ target
Ultimate vacuum degree: 5×10$^{-5}$ Pa
Gas type: Ar
Gas pressure: 0.5 Pa (Film Forming Process of SUL)
Next, a CoZrNb layer was formed at a thickness of from 40 nm to 120 nm, as shown in Table 2, on the TiCr seed layer as a monolayer SUL on the first TiCr seed layer under the following film formation conditions:
Sputtering system: DC magnetron sputtering system
Target: CoZrNb target
Gas type: Ar
Gas pressure: 0.1 Pa (Film Forming Process of Second TiCr Seed Layer)
Next, a second TiCr seed layer was formed at a thickness of 2.5 nm on the CoZrNb layer under the following film formation conditions:
Sputtering system: DC magnetron sputtering system
Target: Ti$_{50}$Cr$_{50}$ target
Ultimate vacuum degree: 5×10$^{-5}$ Pa
Gas type: Ar
Gas pressure: 0.5 Pa (Film Forming Process of NiW Seed Layer)

Next, a NiW seed layer was formed on the second TiCr seed layer at a thickness of 10 nm under the following film formation conditions:

Sputtering system: DC magnetron sputtering system
Target: NiW target
Ultimate vacuum degree: $1\times10^{-5}$ Pa
Gas type: Ar
Gas pressure: 0.5 Pa (Film Forming Process of First Ru Foundation Layer)

Next, a first Ru foundation layer was formed at a thickness of 10 nm on the NiW seed layer under the following film formation conditions:

Sputtering system: DC magnetron sputtering system
Target: Ru target
Gas type: Ar
Gas pressure: 0.5 Pa (Film Forming Process of Second Ru Foundation Layer)

Next, a second Ru foundation layer was formed at a thickness of 20 nm on the first Ru foundation layer under the following film formation conditions:

Sputtering system: DC magnetron sputtering system
Target: Ru target
Gas type: Ar
Gas pressure: 1.5 Pa (Film Forming Process of Magnetic Recording Layer)

Next, a (CoCrPt)—(SiO$_2$) magnetic recording layer was formed at a thickness of 20 nm on the second Ru foundation layer under the following film formation conditions:

Sputtering system: DC magnetron sputtering system
Target: $(Co_{75}Cr_{10}Pt_{15})_{90}$—$(SiO_2)_{10}$ target
Gas type: Ar
Gas pressure: 1.5 Pa (Film Forming Process of Protective Layer)

Next, a carbon protective layer was formed at a thickness of 5 nm on the (CoCrPt)—(SiO$_2$) magnetic recording layer under the following film formation conditions:

Sputtering system: DC magnetron sputtering system
Target: carbon target
Gas type: Ar
Gas pressure: 1.0 Pa (Film Forming Process of Top Coat Layer)

Next, a lubricant was applied to the protective layer to form a top coat layer on the protective layer.

In the above-described way, a magnetic tape which is the vertical magnetic recording medium was provided.

Examples 10 to 14

A magnetic tape was provided similar to Example 6 except that the APC-SUL was formed. Film forming processes of each layer of the APC-SUL are described below.

(First Soft Magnetic Layer)

Firstly, a CoArNb layer was formed as a first soft magnetic layer on the TiCr seed layer under the following film formation conditions:

Sputtering system: DC magnetron sputtering system
Target: CoZrNb target
Gas type: Ar
Gas pressure: 0.1 Pa (Ru Intermediate Layer)

Next, an Ru intermediate layer was formed at a thickness of from 0.8 nm to 1.1 nm, as shown in Table 2, on the CoZrNb layer under the following film formation conditions:

Sputtering system: DC magnetron sputtering system
Target: Ru target
Gas type: Ar
Gas pressure: 0.3 Pa (Second Non-Magnetic Layer)

Next, a CoZrNb layer was formed at a thickness of 20 nm on the Ru intermediate layer under the following film formation conditions:

Sputtering system: DC magnetron sputtering system
Target: CoZrNb target
Gas type: Ar
Gas pressure: 0.1 Pa Examples 15 to 19

A magnetic tape was provided similar to Example 10 except that a CoPtCrB layer was formed at a thickness of from 3 nm to 13 nm, as shown in Table 2, as the CAP layer between the magnetic recording layer and the protective layer under the following film formation conditions:

Sputtering system: DC magnetron sputtering system
Target: CoPtCrB target
Gas type: Ar
Gas pressure: 1.5 Pa Example 20

A magnetic tape was provided similar to Example 6 except that the film formation of the first Ru foundation layer was omitted.

Example 21

A magnetic tape was provided similar to Example 6 except that the film thickness of the SUL was changed to 30 nm.

Comparative Example 5

A magnetic tape was provided similar to Example 6 except that the film formation of the first TrCr seed layer and the first Ru foundation layer was omitted.

(Properties Evaluation)

The magnetic tapes in Examples 5 to 21 and Comparative Example 5 provided as described above were evaluated by the above-described items (a) to (e) and further by the following item (g).

(g) Recording and Reproducing Properties

Recording and reproducing properties were evaluated as follows: Firstly, using a single pole shaped recording head and a tunnel magnetoresistive (TMR) type reproducing head, a so-called drag tester that carries out recording and reproducing by oscillating back and forth the heads by a piezo stage was used for measurement. In a high recording density area exceeding 100 Gb/in$^2$, sufficient recording and reproducing properties are difficult to be attained mainly in terms of recording, even if the vertical magnetic recording medium is used. A combination of the single pole type (SPT) head capable of generating a steep magnetic field in the vertical direction and a bilayer vertical recording medium having the soft magnetic underlayer (SUL) is necessary. Also, the tunnel magnetoresistive (TMR) type reproducing head having a greater change rate of magnetoresistance and a high reproduction sensitivity as compared to the giant magnetoresistive head may be necessary. For this reason, the evaluations by the SPT recording head and the TMR reproducing head were carried out. A read track width of the reproducing head was set to 75 nm. Next, by setting a recording wave length to 300 kFCI (kilo flux change per inch), the SNRs were calculated and determined by a ratio of a peak-to-peak voltage of a reproducing waveform and a voltage determined by an integrated value of a noise spectrum within a band width of 0 kFCI to 600 kFCI. Next, the SNRs determined were evaluated by three stages based on the following scales. Table 3 shows the results. In the Table 3, "Excellent", "Good" and "Bad" were based on the following:

Excellent: SNR is 23 dB or more
Good: SNR is from not less than 20 dB to less than 23 dB
Bad: SNR is less than 20 dB In general, a minimum requisite SNR for the recording and reproducing system is said to be about 16 dB for the SNR provided after waveform equalization and error correction (so-called a digital SNR). The digital SNR is about 4 dB lower than the SNR used in this measurement (used for the evaluation of the above-described recording and reproducing properties). Therefore, in order to ensure 16 dB for the digital SNR, the SNR used in this measurement calls for 20 dB. Accordingly, about 20 dB may be necessary as the minimum requisite SNR in this measurement. In addition, in view of an output decrease due to sliding between the magnetic tape and the magnetic head and a decrease of practical properties, an extra margin for the SNR is desirably set. Taking the margin into consideration, the SNR may be desirably 23 dB or more.

In each magnetic tape according to the embodiment, a linear recording density is 600 kBPI (bit per inch) and a track density is 169 kTPI (tracks per inch) by setting a track pit as two times greater than a track width of the reproducing head. As a result, a surface recording density, 600 kBPI×169 kTPI=101 Gb/in$^2$, can be provided.

(Evaluation Results)

Tables 2 and 3 show configurations and results of the evaluations (a) to (e) and (g) of the magnetic tapes in Examples 5 to 21 and Comparative Example 5.

TABLE 2

| | Seed layer | | | | Soft magnetic underlayer | | |
| --- | --- | --- | --- | --- | --- | --- | --- |
| | ($Ti_xCr_{100-x}$) | | | | CoZrNb | Ru | CoZrNb |
| | Seed layer | State | Oxygen content (at %) | x (at %) | Layer structure | layer thickness (nm) | layer thickness (nm) | layer thickness (nm) |
| Ex. 6 | ✓ | Amorphous | 10 | 50 | Mono-layer | 40 | — | — |
| Ex. 7 | ✓ | | | | Mono-layer | 80 | — | — |
| Ex. 8 | ✓ | | | | Mono-layer | 100 | — | — |
| Ex. 9 | ✓ | | | | Mono-layer | 120 | — | — |
| Ex. 10 | ✓ | | | | Multi-layer | 20 | 1.1 | 20 |
| Ex. 11 | ✓ | | | | Multi-layer | 20 | 1.3 | 20 |
| Ex. 12 | ✓ | | | | Multi-layer | 20 | 1.4 | 20 |
| Ex. 13 | ✓ | | | | Multi-layer | 20 | 0.9 | 20 |
| Ex. 14 | ✓ | | | | Multi-layer | 20 | 0.8 | 20 |
| Ex. 15 | ✓ | | | | Multi-layer | 20 | 1.1 | 20 |
| Ex. 16 | ✓ | | | | Multi-layer | 20 | 1.1 | 20 |
| Ex. 17 | ✓ | | | | Multi-layer | 20 | 1.1 | 20 |
| Ex. 18 | ✓ | | | | Multi-layer | 20 | 1.1 | 20 |
| Ex. 19 | ✓ | | | | Multi-layer | 20 | 1.1 | 20 |
| Ex. 5 | ✓ | | | | — | — | — | — |
| Ex. 20 | ✓ | | | | Mono-layer | 40 | — | — |
| Ex. 21 | ✓ | | | | Mono-layer | 30 | — | — |
| Comp. Ex. 5 | — | — | — | — | Mono-layer | 40 | — | — |

| | Seed layer | | Foundation layer | | Average composition of recording layer $(Co_xPt_yCr_{100-x-y})_{100-z}$—$(SiO_2)_z$ | | | CAP layer (CoPtCrB) |
| --- | --- | --- | --- | --- | --- | --- | --- | --- |
| | TiCr layer | NiW layer | First Ru layer | Orientation state of second Ru layer | x (at %) | y (at %) | z (at %) | Thickness (nm) |
| Ex. 6 | ✓ | ✓ | ✓ | Good | 70 | 15 | 10 | — |
| Ex. 7 | | | ✓ | Good | | | | |
| Ex. 8 | | | ✓ | Good | | | | |

TABLE 2-continued

| | | | |
|---|---|---|---|
| Ex. 9 | ✓ | Good | — |
| Ex. 10 | ✓ | Good | — |
| Ex. 11 | ✓ | Good | — |
| Ex. 12 | ✓ | Good | — |
| Ex. 13 | ✓ | Good | — |
| Ex. 14 | ✓ | Good | — |
| Ex. 15 | ✓ | Good | 8 |
| Ex. 16 | ✓ | Good | 4 |
| Ex. 17 | ✓ | Good | 3 |
| Ex. 18 | ✓ | Good | 12 |
| Ex. 19 | ✓ | Good | 13 |
| Ex. 5 | — | Good | — |
| Ex. 20 | — | Good | — |
| Ex. 21 | ✓ | Good | — |
| Comp. Ex. 5 | — | Bad | — |

TABLE 3

| | Properties | | | | | | |
|---|---|---|---|---|---|---|---|
| | Magnetic properties | | Linear | Read head | | | Recording and reproducing properties |
| | $Hc \perp$ (Oe) | $Rs \perp$ (%) | recording density | track width (nm) | Write Head | Read Head | SNR (dB) | Evaluation |
| Ex. 6 | 4500 | 85 | 300 | 75 | SPT | TMR | 20 | Good |
| Ex. 7 | 4500 | 85 | 300 | 75 | SPT | TMR | 20.5 | Good |
| Ex. 8 | 4500 | 85 | 300 | 75 | SPT | TMR | 21 | Good |
| Ex. 9 | 4500 | 83 | 300 | 75 | SPT | TMR | 21 | Good |
| Ex. 10 | 4500 | 85 | 300 | 75 | SPT | TMR | 23 | Excellent |
| Ex. 11 | 4500 | 85 | 300 | 75 | SPT | TMR | 22 | Good |
| Ex. 12 | 4500 | 85 | 300 | 75 | SPT | TMR | 20 | Good |
| Ex. 13 | 4500 | 85 | 300 | 75 | SPT | TMR | 22 | Good |
| Ex. 14 | 4500 | 85 | 300 | 75 | SPT | TMR | 20 | Good |
| Ex. 15 | 4300 | 87 | 300 | 75 | SPT | TMR | 25 | Excellent |
| Ex. 16 | 4500 | 85 | 300 | 75 | SPT | TMR | 23 | Excellent |
| Ex. 17 | 4500 | 85 | 300 | 75 | SPT | TMR | 22 | Good |
| Ex. 18 | 4200 | 89 | 300 | 75 | SPT | TMR | 23 | Excellent |
| Ex. 19 | 4000 | 90 | 300 | 75 | SPT | TMR | 22 | Good |
| Ex. 5 | 4500 | 85 | 300 | 75 | SPT | TMR | Less than 20 | Bad |
| Ex. 20 | 4200 | 80 | 300 | 75 | SPT | TMR | Less than 20 | Bad |
| Ex. 21 | 4500 | 85 | 300 | 75 | SPT | TMR | Less than 20 | Bad |
| Comp. Ex. 5 | 2500 | 30 | 300 | 75 | SPT | TMR | Less than 20 | Bad |

The results of the evaluations about Examples 5 to 21 and Comparative Example 5 turned out the followings:

In Examples 6 to 9, as the CoZrNb layer (SUL) at a thickness of 40 nm or more were formed between the first and second TiCr seed layers, there was provided good recording and reproducing properties having 20 dB or more of the SNR.

In Examples 10 to 14, as a laminated film (APC-SUL) where a thin Ru layer having a thickness of 0.8 nm to 1.4 nm was disposed between the two CoZrNb layers was formed between the first and second TiCr seed layers, there was provided good recording and reproducing properties having 20 dB or more of the SNR. When the Ru layer had a thickness of 0.9 nm to 1.3 nm, good recording and reproducing properties were provided as compared to Example 6. When the Ru layer had a thickness of about 1.1 nm, especially good recording and reproducing properties were provided.

In Examples 15 to 19, as the CoPtCrB layer was formed between the magnetic recording layer and the protective layer, good recording and reproducing properties were provided as compared to Example 6. When the CoPtCrB layer had a thickness of 4 nm to 12 nm, especially good recording and reproducing properties were provided.

In Example 5, as the CoZrNb layer (SUL) and the first Ru foundation layer were not formed, the SNR was less than 20 dB.

In Example 20, as the first Ru foundation layer was not formed, the SNR was less than 20 dB.

In Example 21, although the CoZrNb layer (SUL) was formed between the first and second TiCr seed layers, the film thickness thereof was less than 40 nm. This is because the SNR was less than 20 dB.

In Comparative Example 5, as the first TiCr seed and first Ru foundation layer were not formed, the orientation of the second Ru foundation layer was bad and the SNR was not less than or less than 20 dB.

In the above-described evaluation (g), as the recording and reproducing properties were evaluated using the SPT recording head and the TMR reproducing head, the magnetic tape in Example 5 had less than 20 dB of the SNR. However, when the recording and reproducing properties were evaluated using the ring shaped recording head and the GMR reproducing head, the result of the evaluation (f) reveled that good recording and reproducing properties where the SNR was 20 dB or more were provided even in the magnetic tape in Example 5, as described above. Also, as in the evaluation (f), if the recording and reproducing properties are evaluated using the ring shaped recording head and the GMR reproducing head in Examples 20 and 21, good recording and reproducing properties where the SNR is 20 dB or more are provided.

In view of the above, in order to attain good recording and reproducing properties in the magnetic tape having 100 Gb/in² of the recording density area, the soft magnetic underlayer (SUL) having a thickness of 40 nm or more is desirably disposed between the first and second foundation layers.

From a standpoint of further improving the recording and reproducing properties, a multilayer soft magnetic underlayer (APC-SUL) is desirably used. The intermediate layer included in the magnetic underlayer has a thickness, for example, of 0.8 nm to 1.4 nm, desirably 0.9 nm to 1.3 mm, more desirably about 1.1 nm.

From a standpoint of still further improving the recording and reproducing properties, the CPA layer is desirably disposed between the magnetic recording layer and the protective layer and desirably has a thickness of 4 nm to 12 nm.

While the embodiments of the present technology are described for particular applications, it should be understood that the present technology is not limited to the above-described embodiments, and variations and modifications may be made based on the technical spirits of the present technology.

For example, the configurations, the methods, the processes, the shapes, the materials and the numerical values cited in the above-described embodiments are only illustrative, and different configurations, methods, processes, shapes, materials and numerical values may be used as necessary.

Also, the configurations, the methods, the processes, the shapes, the materials and the numerical values in the above-described embodiments can be combined without departing from the spirits of the present technology.

As used herein, the term "comprising" involves more limiting words and phrases "consisting essentially of" and "consisting of".

The present technology may have the following configurations.

(1) A magnetic recording medium, including:
a base;
a seed layer;
a foundation layer; and
a recording layer, the seed layer being disposed between the base and the foundation layer, having an amorphous state, including an alloy containing Ti, Cr and O, a percentage of Ti being 30 atomic % to 100 atomic % based on a total amount of Ti and Cr contained in the seed layer, and a percentage of O being 15 atomic % or less based on a total amount of Ti, Cr and O contained in the seed layer.

(2) The magnetic recording medium according to (1), in which
the seed layer decreases irregularities on the surface of the base.

(3) The magnetic recording medium according to (1) or (2) above, in which
the foundation layer includes Ru.

(4) The magnetic recording medium according to any one of (1) to (3) above, in which
the foundation layer includes a first foundation layer and a second foundation layer, and
the first foundation layer is disposed at a recording layer side and includes Ru.

(5) The magnetic recording medium according to any one of (1) to (4) above, in which
the recording layer has a granular structure where particles containing Co, Pt and Cr are separated by an oxide.

(6) The magnetic recording medium according to (5) above, in which
the recording layer has an average composition shown by the following chemical formula (1):

$$(Co_xPt_yCr_{100-x-y})_{100-z}\text{—}(SiO_2)_z \quad (1)$$

(in the formula (1), x, y and z have a value of 69≤x≤72, 12≤y≤16, 9≤z≤12).

(7) The magnetic recording medium according to any one of (1) to (6) above, further including:
another seed layer disposed between the seed layer and the foundation layer.

(8) The magnetic recording medium according to any one of (1) to (7) above, further including:
a soft magnetic layer disposed between the seed layer and the foundation layer.

(9) The magnetic recording medium according to (8) above, in which
a film thickness of the soft magnetic layer is 40 nm to 140 nm.

(10) The magnetic recording medium according to (8) or (9) above, in which
the soft magnetic layer includes a first soft magnetic layer, an intermediate layer and a second soft magnetic layer, and
the intermediate layer is disposed between the first magnetic layer and the second magnetic layer.

(11) The magnetic recording medium according to any one of (8) to (10) above, further including:
another seed layer disposed between the soft magnetic layer and the foundation layer.

(12) The magnetic recording medium according to any one of (1) to (11) above, further including:
a layer containing Co, Cr and Pt disposed on the recording layer.

(13) The magnetic recording medium according to any one of (1) to (12) above, in which
the seed layer, the foundation layer and the recording layer are sequentially formed by a roll-to-roll method.

(14) A magnetic recording medium, including:
a base;
a seed layer;
a foundation layer; and
a recording layer, the seed layer being disposed between the base and the foundation layer, having an amorphous state, including an alloy containing Ti and Cr, and a percentage of Ti being 30 atomic % to 100 atomic % based on a total amount of Ti and Cr contained in the seed layer.

(15) A magnetic recording medium, including:
a base;
a layer having an amorphous state and containing Ti and Cr;
a foundation layer; and
a recording layer, the layer containing Ti and Cr being disposed between the base and the foundation layer, and a percentage of Ti in the layer containing Ti and Cr being 30 atomic % to 100 atomic % based on a total amount of Ti and Cr.

(16) A method of producing a magnetic recording medium, including:
sequentially forming a seed layer, a foundation layer and a recording layer on a base by a roll-to-roll method, the seed layer having an amorphous state and including an alloy containing Ti, Cr and O, a percentage of Ti being 30 atomic % to 100 atomic % based on a total amount of Ti and Cr contained in the seed layer, and a percentage of O being 15 atomic % or less based on a total amount of Ti, Cr and O contained in the seed layer.

(17) A method of producing a magnetic recording medium, including:
laminating a plurality of thin-films on a surface of a base while the base is transferred along a periphery of a rotator, at least two layer of a plurality of the thin-films being sequentially formed.

(18) The method of producing a magnetic recording medium according to (17) above, in which
a temperature of the rotator is desirably 10° C. or less,
the periphery of the rotator is contacted with the base having an angle of 220° or more,
a tensile force of the base is 4 g/mm or more per 1 mm width, and
a maximum dynamic rate of a plurality of the thin-films is 70 nm·m/min or less.

(19) The method of producing a magnetic recording medium according to (17) or (18) above, in which
a plurality of the thin-films include a seed layer, a foundation layer and a recording layer.

(20) The method of producing a magnetic recording medium according to (19) above, in which
a plurality of the thin-films further include a soft magnetic layer.

(21) A method of producing a magnetic recording medium, including:
sequentially forming a layer having an amorphous state and containing Ti and Cr, a foundation layer and a recording layer on a base by a roll-to-roll method, the layer containing Ti and Cr being disposed between the base and the foundation layer, and a percentage of Ti being 30 atomic % to 100 atomic % based on a total amount of Ti and Cr contained in the layer containing Ti and Cr.

It should be understood by those skilled in the art that various modifications, combinations, sub-combinations and alterations may occur depending on design requirements and other factors insofar as they are within the scope of the appended claims or the equivalents thereof.

What is claimed is:

1. A magnetic recording medium, consisting of:
a base;
a first seed layer;
a foundation bilayer consisting of a first foundation layer and a second foundation layer, wherein the first foundation layer consists of Ru, and the second foundation layer consists of Ru, Ru—$SiO_2$, Ru—$TiO_2$, or Ru—$ZrO_2$;
a soft magnetic layer disposed between the first seed layer and the foundation bilayer, wherein the soft magnetic layer includes a first soft magnetic layer consisting of CoZrNb, an intermediate layer consisting of Ru, and a second soft magnetic layer consisting of CoZrNb, and the intermediate layer is disposed between the first soft magnetic layer and the second soft magnetic layer;
a second seed layer consisting of an upper seed layer and a lower seed layer, wherein the second seed layer is disposed between the soft magnetic layer and the foundation bilayer such that the upper seed layer is adjacent to the foundation bilayer and the lower seed layer is adjacent to the soft magnetic layer, wherein the lower seed layer consists of TiCr, and the upper seed layer consists of NiW;
a magnetic recording layer that is a monolayer;
a protective layer on the surface of the recording layer; and
a top coat layer on the surface of the protective layer;
the first seed layer being disposed between the base and the soft magnetic layer, having an amorphous state, and including an alloy containing Ti, Cr, and O; the percentage of Ti being 30 atomic % to less than 100 atomic % based on a total amount of Ti and Cr contained in the lower seed layer, and the percentage of O being greater than 0 atomic % to 15 atomic % based on a total amount of Ti, Cr and O contained in the first seed layer,
wherein the foundation bilayer is adjacent to the magnetic recording layer,
wherein the base is flexible and is made of a polymer resin material, wherein the polymer resin material comprises a polyester, a polyolefin, a cellulose derivative, a vinyl-based resin, a polyimide, a polyamide, and/or a polycarbonate, and
wherein the magnetic recording medium is a magnetic recording tape.

2. The magnetic recording medium according to claim 1, wherein
the first seed layer covers irregularities on the surface of the base.

3. The magnetic recording medium according to claim 1, wherein
the recording layer has a granular structure where particles containing Co, Pt and Cr are separated by an oxide.

4. The magnetic recording medium according to claim 3, wherein
the recording layer has an average composition shown by the following chemical formula (1):

$$(Co_xPt_yCr_{100-x-y})_{100-z}-(SiO_2)_z \qquad (1)$$

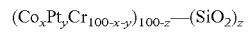

wherein 69≤x≤72, 12≤y≤16, 9≤z≤12.

5. The magnetic recording medium according to claim 1, wherein
the first seed layer, the foundation bilayer and the recording layer are sequentially formed by a roll-to-roll method.

6. The magnetic recording medium according to claim 1, wherein the second foundation layer consists of Ru.

7. The magnetic recording medium according to claim 1, wherein the second foundation layer consists of Ru—$SiO_2$, Ru—$TiO_2$, or Ru—$ZrO_2$.

8. The magnetic recording medium according to claim 1, wherein a film thickness of the soft magnetic layer is 40 nm to 140 nm.

9. A magnetic recording medium consisting of:
a base;
a first seed layer;
a foundation bilayer consisting of a first foundation layer and a second foundation layer, wherein the first foundation layer consists of Ru, and the second foundation layer consists of Ru, Ru—$SiO_2$, Ru—$TiO_2$, or Ru—$ZrO_2$;
a soft magnetic layer disposed between the first seed layer and the foundation layer, wherein the soft magnetic layer includes a first soft magnetic layer consisting of CoZrNb, an intermediate layer consisting of Ru, and a second soft magnetic layer consisting of CoZrNb, and the intermediate layer is disposed between the first soft magnetic layer and the second soft magnetic layer;

a second seed layer consisting of an upper seed layer and a lower seed layer, wherein the second seed layer is disposed between the soft magnetic layer and the foundation bilayer such that the upper seed layer is adjacent to the foundation bilayer and the lower seed layer is adjacent to the soft magnetic layer, wherein the lower seed layer consists of TiCr, and the upper seed layer consists of NiW;

a magnetic recording layer that is a monolayer;

a layer containing CoCrPtB disposed on the recording layer;

a protective layer on the surface of the CoCrPtB layer; and a top coat layer on the surface of the protective layer;

the first seed layer being disposed between the base and the foundation layer, having an amorphous state, and including an alloy containing Ti, Cr, and O; the percentage of Ti being 30 atomic % to less than 100 atomic % based on a total amount of Ti and Cr contained in the first seed layer, and the percentage of O being greater than 0 atomic % to 15 atomic % based on a total amount of Ti, Cr and O contained in the first seed layer, wherein the foundation bilayer is adjacent to the magnetic recording layer, wherein the base is flexible and is made of a polymer resin material, wherein the polymer resin material comprises a polyester, a polyolefin, a cellulose derivative, a vinyl-based resin, a polyimide, a polyamide, and/or a polycarbonate, and wherein the magnetic recording medium is a magnetic recording tape.

10. The magnetic recording medium according to claim 9, wherein a film thickness of the soft magnetic layer is 40 nm to 140 nm.

11. The magnetic recording medium according to claim 9, wherein the first seed layer covers irregularities on the surface of the base.

12. The magnetic recording medium according to claim 9, wherein the recording layer has a granular structure where particles containing Co, Pt and Cr are separated by an oxide.

13. The magnetic recording medium according to claim 12, wherein the recording layer has an average composition shown by the following chemical formula (1):

$(Co_xPt_yCr_{100-x-y})_{100-z}\text{—}(SiO_2)_z$     (1)

wherein $69 \leq x \leq 72$, $12 \leq y \leq 16$, $9 \leq z \leq 12$.

14. The magnetic recording medium according to claim 9, wherein the second foundation layer consists of Ru.

15. The magnetic recording medium according to claim 9, wherein the second foundation layer consists of Ru—SiO$_2$, Ru—TiO$_2$, or Ru—ZrO$_2$.

* * * * *